United States Patent
Nakajima et al.

(10) Patent No.: US 7,314,428 B2
(45) Date of Patent: Jan. 1, 2008

(54) DOWNSHIFT CONTROL FOR AUTOMOTIVE AUTOMATIC TRANSMISSION

(75) Inventors: Nobuyori Nakajima, Kariya (JP); Takaji Murakawa, Anjo (JP); Tetsuji Kozaki, Aichi-ken (JP)

(73) Assignee: Denso Corporation, Kariya, Aichi-pref. (JP)

( * ) Notice: Subject to any disclaimer, the term of this patent is extended or adjusted under 35 U.S.C. 154(b) by 201 days.

(21) Appl. No.: 11/290,820

(22) Filed: Dec. 1, 2005

(65) Prior Publication Data
US 2006/0135315 A1 Jun. 22, 2006

(30) Foreign Application Priority Data
Dec. 1, 2004 (JP) .............................. 2004-347990

(51) Int. Cl.
*F16H 61/06* (2006.01)
(52) U.S. Cl. ........................ 477/118; 477/144; 477/148
(58) Field of Classification Search ................ 477/118, 477/144, 148
See application file for complete search history.

(56) References Cited
U.S. PATENT DOCUMENTS
5,722,913 A * 3/1998 Gierer ......................... 477/148

2002/0019292 A1 * 2/2002 Popp et al. ................ 477/156

FOREIGN PATENT DOCUMENTS
| JP | H05-338469 | 12/1993 |
| JP | H06-235451 | 8/1994 |
| JP | 2002-310277 | 10/2002 |

* cited by examiner

*Primary Examiner*—Sherry Estremsky
*Assistant Examiner*—Edwin A Young
(74) *Attorney, Agent, or Firm*—Nixon & Vanderhye P.C.

(57) ABSTRACT

An automotive automatic transmission control system is provided which is designed to increase the output of an engine in response to a driver's request to downshift a transmission for setting up the engine braking and to load the amount of working fluid to an on-coming clutch quickly during the downshift. The system works to determine whether the loaded amount of working fluid is excessive or lacking using the speeds of an input shaft of the transmission and the engine to correct the amount of working fluid to be used upon a subsequent downshift request. The use of the two speeds enables the fact that the loaded fluid amount is excessive which arises from a rise in the speed of the input shaft caused by the engine output increasing control, not by completion of the loading of the working fluid to the on-coming clutch to be found accurately.

14 Claims, 27 Drawing Sheets

FIG. 4

| CLUTCH BRAKE / RANGE | C1 | B1 | C2 | C0 | B0 |
|---|---|---|---|---|---|
| R | ○ | | | | ○ |
| P·N | | | | | |
| 1ST SPEED | | | | ○ | ○ |
| 2ND SPEED | | ○ | | ○ | |
| 3RD SPEED | | | ○ | ○ | |
| 4TH SPEED | | ○ | ○ | | |

○ CLUTCH ENGAGED TO TRANSMIT TORQUE

DOWNSHIFT CONTROL FOR AUTOMOTIVE AUTOMATIC TRANSMISSION

CROSS REFERENCE TO RELATED DOCUMENT

The present application claims the benefit of Japanese Patent Application No. 2004-347990 filed on Dec. 1, 2004, the disclosure of which is incorporated herein by reference.

BACKGROUND OF THE INVENTION

1. Technical Field of the Invention

The present invention relates generally to relates generally to an automotive automatic transmission controller equipped with a feature to increase an engine power for minimizing a shift shock occurring during downshift control executed according to a driver's deceleration intention to develop the engine braking.

2. Background Art

Most modern automotive automatic transmissions are designed to switch between hydraulic control lines to establish engagement and disengagement of frictional elements such as clutches and brakes selectively for achieving a desired one of speeds. When the accelerator of the vehicle is released fully during running on a downhill, but the engine braking is insufficient, the driver of the vehicle usually turns off the overdrive switch or moves the shift lever from the D to S or L range to make a downshift for increasing the engine braking.

Such a downshift to increase the engine braking with the accelerator released will result in an increased gear ratio of the automatic transmission, thus elevating the speed of the engine. In such a running mode of the vehicle to set up the engine braking, the throttle valve is usually closed, so that the torque is transmitted from an output shaft of the transmission to the engine through some of the frictional elements working to establish an after-downshift speed to increase the speed thereof. This may cause the time required for the downshift to be increased, thus giving rise to a delay in the engine braking or inertia torque arising from the increased speed of the engine to appear as braking torque, which results in an instantaneous increase in the engine braking, leading to a large-scale shift shock. A rapid rise in torque transmitted through the frictional elements of the automatic transmission under hydraulic control will result in a quick rise in speed of the engine, so that the downshifting time decreases, but however, the braking torque increases excessively, thus resulting in a more increase in the shift shock.

Japanese Patent No. 2924463 teaches a transmission control system for avoiding the above problems. This system includes a function to increase the power of the engine temporarily upon a downshift to the speed of the automatic transmission which creates the engine braking with the accelerator released.

Japanese patent First Publication No. 2002-310277 discloses a downshift control system which is designed not to increase the power of the engine upon the downshift, but to perform down shift control in a sequence of three stages. In the initial stage, the system commences quick loading control to charge or load the working fluid to one(s) of frictional elements of an automatic transmission (will be referred to as an on-coming clutch below) which is to be engaged to achieve the downshift until just before the on-coming clutch is engaged. In the second stage, the system decreases and keeps the hydraulic pressure acting on the on-coming clutch at a standby level to develop the action of the downshift. In the final stage, the system increases the hydraulic pressure acting on the on-coming clutch to complete the downshift at a time when the speed of an input shaft of a transmission gearbox rises and reaches one corresponding to the downshifted speed.

When the amount of working fluid loaded to the on-coming clutch during the quick loading control becomes excessive, it will cause the on-coming clutch to be engaged before the speed of the input shaft of the transmission gearbox reaches the above value, thereby resulting in an early downshift to contribute to an uncomfortable shift shock.

Conversely, when the amount of working fluid loaded to the on-coming clutch becomes lacking, it will result in a time lag between a rise in the speed of the input shaft of the transmission gearbox up to the one corresponding to the downshifted speed and actual engagement of the on-coming, which leads to the delay of the downshift. This results in an undesirable quick rise in the speed of the input shaft of the transmission gearbox to induce the shift shock.

In order to avoid the above problems, the downshift control system, as taught in the above publication, works to learn the overloading or underloading of the working fluid to the on-coming clutch under the quick loading control using characteristics of a rise in the speed of the input shaft of the transmission gearbox to correct a time duration for which the quick loading control is to be executed or a hydraulic pressure command to determine the hydraulic pressure to be applied to the on-coming clutch upon a following downshift request.

Japanese Patent First Publication No. 6-235451 teaches a downshift control system which is like the above latter publication, designed not to increase the power of the engine upon the downshift, but to learn the time duration for which the quick loading control is to be executed or the hydraulic pressure command to be used upon a following downshift request so as to bring the time the speed of the input shaft of the transmission gearbox into agreement with the time of completion of the quick loading control in order to correct the excess or lack of the working fluid loaded to the on-coming clutch under the quick loading control.

For the purpose of eliminating the shift shock or time lag of the downshift, the engine power increasing control, as taught in the first publication, and learning correction in the quick loading control, as taught in the second or third publication, may be combined to control the downshift of the automatic transmission.

Such a combination, however, results in a difficulty in specifying whether a rise in the speed of the input shaft speed of the transmission gearbox after the quick loading control has arisen from the engine power increasing control or the completion of loading of the working fluid to the on-coming clutch, which may lead to an error in learning and correcting the excess or lack of the working fluid loaded to the on-coming clutch.

SUMMARY OF THE INVENTION

It is therefore a principal object of the invention to avoid the disadvantages of the prior art.

It is another object of the invention to provide an improved structure of an automatic transmission controller which is equipped with a combination of the engine power increasing control and the learning correction of the quick loading control and designed to find an excess of working fluid loaded to the on-coming clutch during the quick loading control and correct it accurately.

It is a further object of the invention to provide an automatic transmission controller which is equipped with a combination of the engine power increasing control and the learning correction of the quick loading control and designed to find a lack of working fluid loaded to the on-coming clutch during the quick loading control and correct it accurately.

According to one aspect of the invention, there is provided an automatic transmission control apparatus for a vehicle which comprises: (a) a hydraulic control circuit working to control hydraulic pressures of working fluid loaded to a plurality of frictional elements of a transmission mechanism joined at an input shaft thereof to an engine through a torque converter to selectively achieve engagement and disengagement of the frictional elements for establishing a required speed of the transmission mechanism; (b) a downshift control circuit working to make a downshift of the transmission mechanism through the hydraulic control circuit to develop an engine braking speed which establishes engine braking in a sequence of a first, a second, and a third downshifting stage upon a deceleration downshift request that is a request to downshift the transmission mechanism to decelerate the vehicle, in the first downshifting stage, the downshift control circuit controlling a given parameter to perform quick loading control which loads the working fluid at a higher rate to an on-coming frictional element that is one of the frictional elements which achieves the engine braking speed until just before the on-coming frictional element is engaged, in the second downshifting stage entered following the first downshifting stage, the downshift control circuit keeping the working fluid loaded to the on-coming frictional element at a given standby pressure to conduct the downshift, in the third downshifting stage entered when the downshift reaches a given degree in the second downshifting stage, the downshift control circuit increasing the hydraulic pressure applied to the on-coming clutch to complete the downshift; (c) an engine output increasing circuit working to perform engine output increasing control to increase an output of the engine during the downshift of the transmission mechanism regardless of a request to accelerate the engine made by an operator; (d) a fluid-overloading decision circuit working to decide whether a quickly loaded fluid amount that is an amount of the working fluid loaded to the on-coming clutch during the quick loading control is excessive or not based on an input shaft speed that is a speed of the input shaft of the transmission mechanism and a speed of the engine; and (e) a fluid-loaded amount correcting circuit working to correct the parameter controlled by the downshift control circuit to decrease an amount of the working fluid which is to be loaded to the on-coming clutch during the quick loading control upon a following input of the deceleration downshift request when it is decided that the quickly loaded fluid amount is excessive.

The use of the speed of the engine in addition to the speed of the input shaft of the transmission mechanism enables the fact that the quickly loaded fluid amount is excessive which arises from a rise in the speed of the input shaft caused by the engine output increasing control, not by completion of the loading of the working fluid to the on-coming clutch to be found accurately.

In the preferred mode of the invention, when one of a difference between the input shaft speed of the transmission mechanism and the speed of the engine and a ratio of the input shaft speed and the speed of the engine is smaller than a given value, the fluid-overloading decision circuit decides that the quickly loaded fluid amount is excessive. This is based on the fact that the speed of the input shaft becomes greater than the speed of the engine when the quickly loaded fluid amount is excessive.

When the quickly loaded fluid amount becomes lacking, it will cause the speed of the input shaft to rise rapidly near the completion of the downshift, which may an error in determining the lack of the quickly loaded fluid amount. In order to avoid this problem, the fluid-overloading decision circuit decides whether the quickly loaded fluid amount is excessive or not during a time when one of a given downshift degree parameter representing a degree of the downshift of the transmission mechanism and a gear ratio of the transmission mechanism is smaller than a given value.

The fluid-overloading decision circuit may decide whether the quickly loaded fluid amount is excessive or not during one of times when the engine output increasing control is being executed and when a throttle valve is opened to a given angle or more. This permits the determination to be made whether quickly loaded fluid amount is excessive or not during a rise in the speed of the engine by the engine output increasing control and prohibits it thereafter, thus avoiding an error in determining the excess of the quickly loaded fluid amount arising from a rapid rise in the speed of the input shaft occurring near the completion of the downshift.

When it is determined that the quickly loaded fluid amount is excessive, the fluid-loaded amount correcting circuit may correct at least one of a time duration in which the quick loading control is executed and a hydraulic control command to control the hydraulic pressure applied to the on-coming clutch through the hydraulic control circuit to decrease the amount of the working fluid.

The fluid-overloading decision circuit determines an excess of the working fluid loaded to the on-coming clutch when it is determined that the quickly loaded fluid amount is excessive. The fluid-loaded amount correcting circuit corrects at least one of the time duration and the hydraulic control command based on the excess of the working fluid.

According to the second aspect of the invention, there is provided an automatic transmission control apparatus for a vehicle which comprises: (a) a hydraulic control circuit working to control hydraulic pressures of working fluid loaded to a plurality of frictional elements of a transmission mechanism joined at an input shaft thereof to an engine mounted in a vehicle through a torque converter to selectively achieve engagement and disengagement of the frictional elements for establishing a required speed of the transmission mechanism; (b) a downshift control circuit working to make a downshift of the transmission mechanism through the hydraulic control circuit to develop an engine braking speed which establishes engine braking in a sequence of a first, a second, and a third downshifting stage upon a deceleration downshift request that is a request to downshift the transmission mechanism to decelerate the vehicle, in the first downshifting stage, the downshift control circuit controlling a given parameter to perform quick loading control which loads the working fluid quickly to an on-coming frictional element that is one of the frictional elements which achieves the engine braking speed until just before the on-coming frictional element is engaged, in the second downshifting stage entered following the first downshifting stage, the downshift control circuit keeping the working fluid loaded to the on-coming frictional element at a given standby pressure to conduct the downshift, in the third downshifting stage entered when the downshift reaches a given degree in the second downshifting stage, the downshift control circuit increasing the hydraulic pressure applied to the on-coming clutch to complete the downshift; (c) an engine output increasing circuit working to perform engine output increasing control to increase an output of the engine during the downshift of the transmission mechanism regardless of a request to accelerate the engine made by an operator; (d) a fluid-lack decision circuit working to decide whether a quickly loaded fluid amount that is an amount of the working fluid loaded to the on-coming clutch during the quick loading control is lacking or not based on a determination of whether a return of one of a gear ratio of the transmission mechanism and a given downshift degree parameter representing a degree of the downshift of the transmission mechanism has occurred or not; and (e) a fluid-loaded amount correcting circuit working to correct the parameter controlled by the downshift control circuit to increase an amount of the working fluid which is to be loaded to the on-coming clutch during the quick loading control upon a following input of the deceleration downshift request when it is decided that the quickly loaded fluid amount is lacking.

In the preferred mode of the invention, the fluid-lack decision circuit samples and stores a peak of one of the gear ratio and the downshift degree parameter in a cycle during the downshift. When a difference between the peaks, as sampled at a latest cycle and at an earlier cycle, exceeds a given value, the fluid-lack decision circuit decides that the quickly loaded fluid amount is lacking.

The fluid-lack decision circuit determines a rate of a change in one of the gear ratio and the downshift degree parameter during the downshift. When rate is greater than or equal to a given value, the fluid-lack decision circuit may decide that the quickly loaded fluid amount is lacking.

After completion of the engine output increasing control or when a throttle valve is closed to a given angle or less, the fluid-overloading decision circuit may decide whether the quickly loaded fluid amount is lacking or not.

When it is determined that the quickly loaded fluid amount is lacking, the fluid-loaded amount correcting circuit corrects at least one of a time duration in which the quick loading control is executed and a hydraulic control command to control the hydraulic pressure applied to the on-coming clutch through the hydraulic control circuit to increase the amount of the working fluid.

The fluid-overloading decision circuit determines a lack of the working fluid loaded to the on-coming clutch when it is determined that the quickly loaded fluid amount is lacking. The fluid-loaded amount correcting circuit corrects at least one of the time duration and the hydraulic control command based on the lack of the working fluid.

The fluid-loaded amount correcting circuit may correct the parameter controlled by the downshift control circuit to decrease the working fluid to be loaded to the on-coming clutch under the quick loading control until the fluid-lack decision circuit decides that the quickly loaded fluid amount is lacking to learn a value of the parameter just before lack of the quickly loaded fluid amount. The downshift control circuit may perform the quick loading control using the learned value of the parameter upon a subsequent input of the deceleration downshift request.

The automatic transmission control apparatus may further comprise a fluid-overloading decision circuit working to decide whether the quickly loaded fluid amount is excessive or not based on an input shaft speed that is a speed of the input shaft of the transmission mechanism and a speed of the engine. The fluid-loaded amount correcting circuit works to correct the parameter by a greater amount to reduce a degree of overloading of the working fluid loaded to the on-coming clutch at a faster rate when the quickly loaded fluid amount is determined by the fluid-overloading decision circuit to be excessive and also correct the parameter by a smaller amount until the quickly loaded fluid amount is determined by the fluid-lack decision circuit to be lacking when the quickly loaded fluid amount is determined not to be excessive to learn the value of the parameter just before lack of the quickly loaded fluid amount.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4 is a table which shows a combination of engagements of clutches and brakes of an automatic transmission in each gear position of the transmission;

DESCRIPTION OF THE PREFERRED EMBODIMENTS

Figure 1:
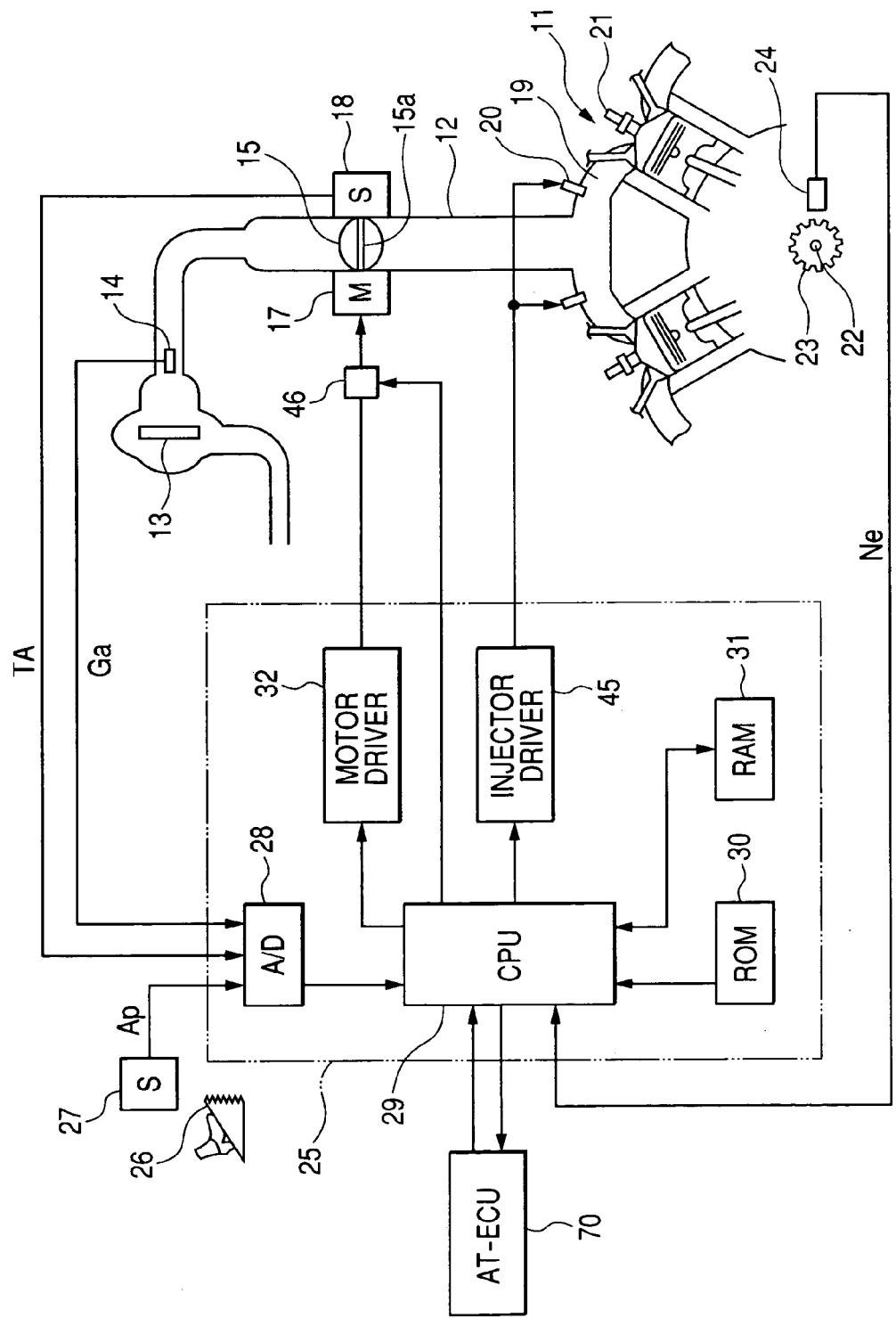
FIG. 1 is a block diagram which shows an engine control system according to the first embodiment of the invention.
Figure 2:
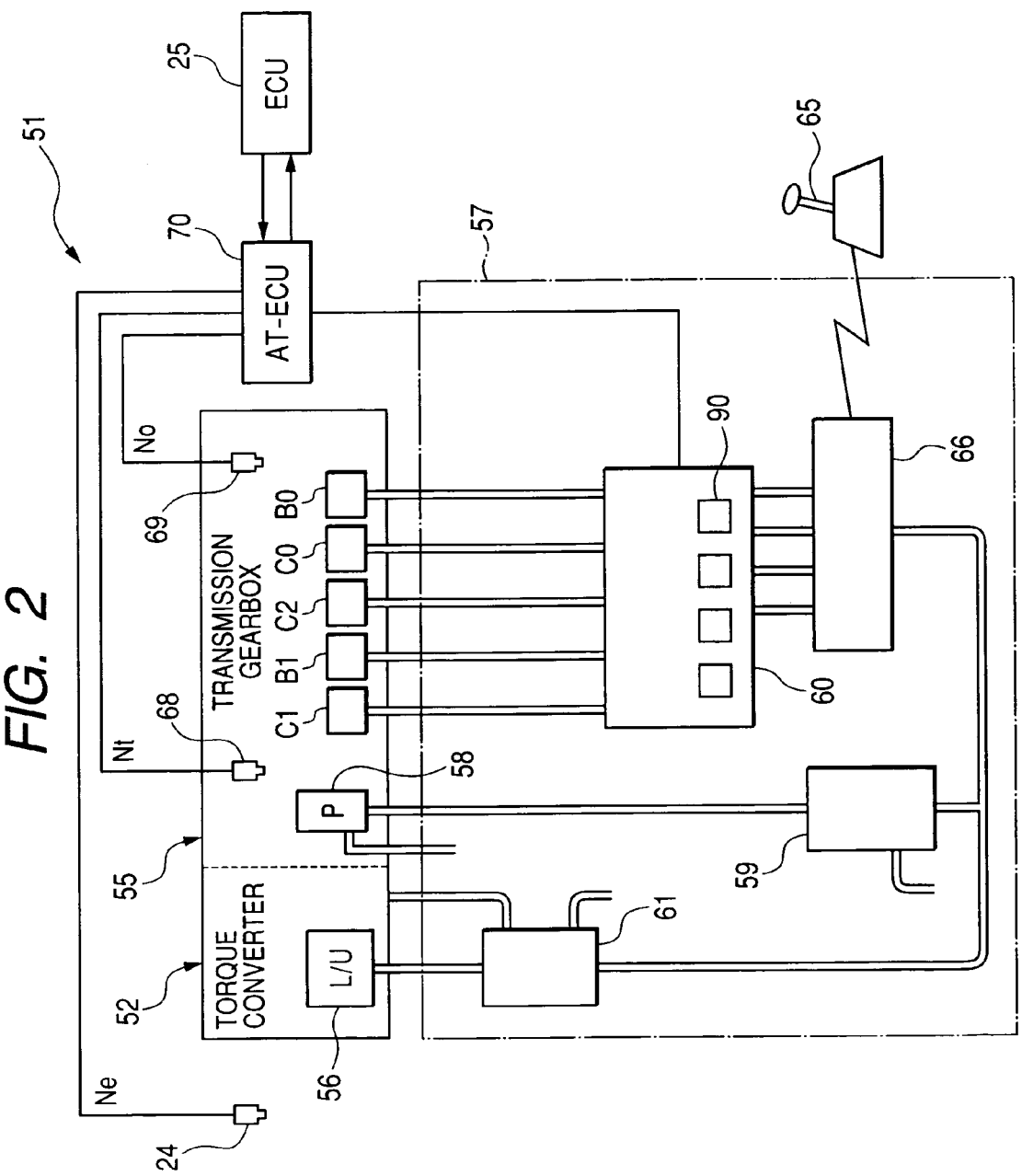
FIG. 2 is a block diagram which shows an automatic transmission and a hydraulic control circuit which are to be controlled by the engine control system of FIG. 1.

Referring to the drawings, wherein like reference numbers refer to like parts in several views, particularly to FIG. 1, there is shown an engine control system according to the first embodiment of the invention which is designed to control an operation of an automotive internal combustion engine 11 and a downshift operation of an automatic transmission 51, as illustrated in FIG. 2, with aid of activity of an electronic throttle control (ETC) system.

The engine 11 is connected to an intake pipe 12. An air cleaner 13 is installed upstream of the intake pipe 12. An air flow meter 14 is disposed downstream of the air cleaner 13 which measures an intake air flow rate Ga. A throttle valve 15 is disposed downstream of the air flow meter 14. The throttle valve 15 has a rotating shaft 15a connected to an electric motor 17 such as a DC motor. The motor 17 works to control the position (i.e., the amount of throttle opening) of the throttle valve 15. A throttle position sensor 18 measures the position of the throttle valve 15 and outputs a throttle position signal TA indicative thereof.

An intake manifold 19 which delivers the intake air having passed through the throttle valve 15 to each cylinder of the engine 11 has injectors 20 installed therein. A spark plug 21 is installed in a cylinder head of each cylinder of the engine 11. A crank angle sensor 24 is disposed which faces an outer periphery of a signal rotor 23 fitted on a crankshaft 22 of the engine 11. The crank angle sensor 24 is responsive to passages of protrusions on the periphery of the signal rotor 23 to produce a series of pulses (will be referred to as an engine speed signal Ne below). An engine ECU (electronic control unit) 25 monitors the engine speed signal Ne and measures the frequency thereof to determine the speed of the engine 11.

The engine control system also includes an accelerator stroke sensor 27 which works to measure the amount of pedal depression or stroke of an accelerator pedal 26 and output a voltage signal Ap indicating the stroke of the accelerator pedal 26 to the engine ECU 25 through an A/D converter 28. The intake air flow rate signal Ga, as produced by the air flow meter 14, and the throttle position signal TA, as produced by the throttle position sensor 18, are also inputted to the engine ECU 25 through the A/D converter 28.

The engine ECU 25 is implemented by a microcomputer consisting of a CPU 29, a ROM 30, a RAM 31, etc. The CPU 29 executes various engine control programs stored in the ROM 30 selectively to control the ignition timing of each of the spark plugs 21 and the pulse width of an injection signal inputted to each of the injectors 20 through an injector driver circuit 45 to adjust the quantity of fuel to be injected to the engine 11 to a target one.

The CPU 29 also executes throttle control programs stored in the ROM 30 to feedback-control the motor 17 of the throttle valve 15 under the PID control through a motor driver circuit 32 to bring the throttle position, as measured by the throttle position sensor 18, into agreement with a target one. If this electronic throttle system (ETS) has failed in operation, the CPU 29 activates a safety circuit 46, as disposed between the motor driver circuit 32 and the motor 17, to keep the motor 17 in an off-state and maintains the throttle valve 15 in a given position to allow the vehicle to run to a motor vehicle workshop.

Figure 3:
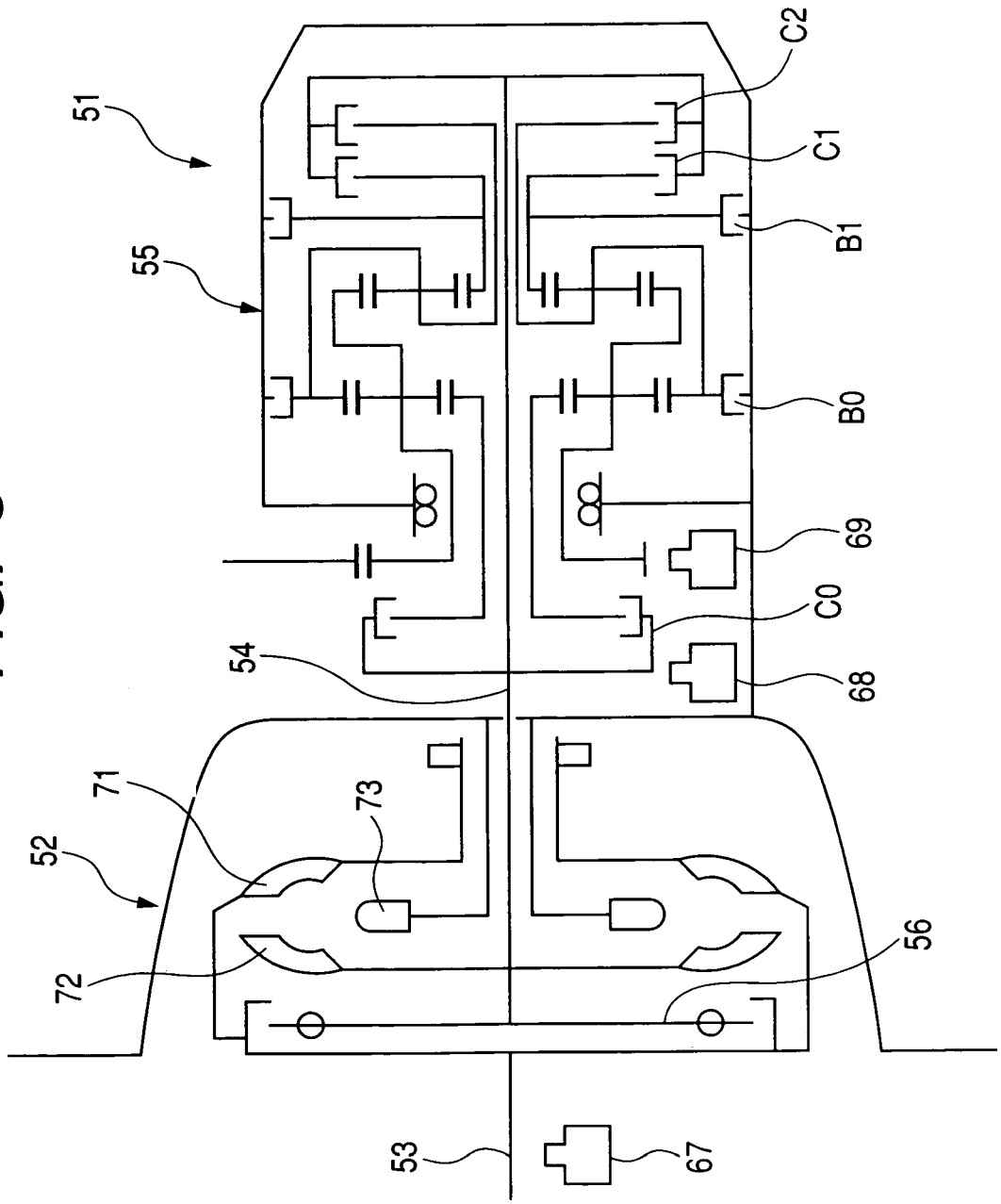
FIG. 3 is a schematically sectional view which shows an internal structure of an automatic transmission to be controlled by the engine control system of FIG. 1.
Figure 5:
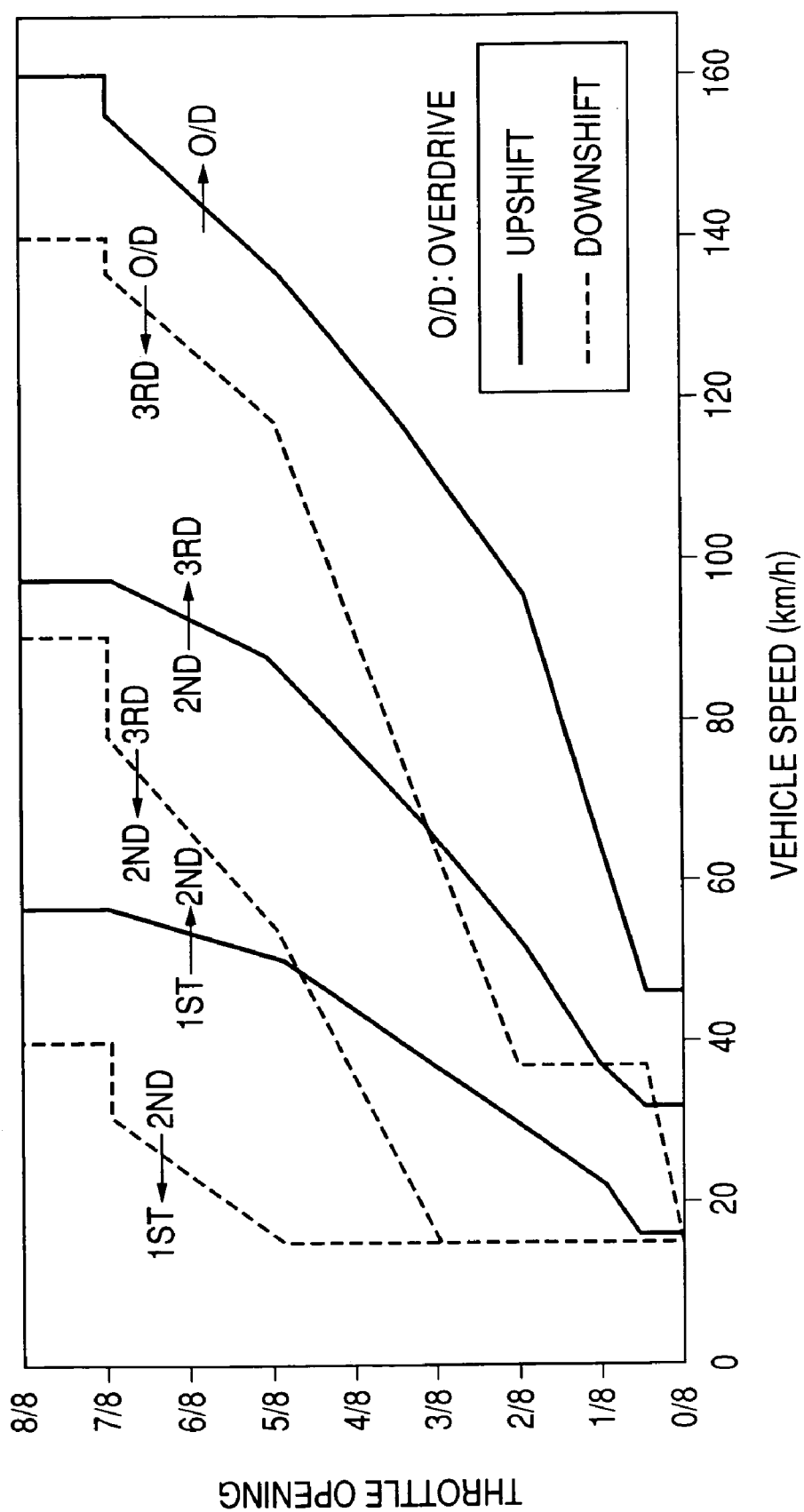
FIG. 5 is a graph which shows a relation between the amount of opening of a throttle valve and the speed of a vehicle in terms of gear shifts of an automatic transmission.

The engine ECU 25 is connected to an automatic transmission ECU 70. The AT-ECU 70 works to control an operation of an automatic transmission 51, as illustrated in FIGS. 2 and 3.

The automatic transmission 51 generally includes a torque converter 52 and a hydraulic transmission gearbox 55. The torque converter 52 has an input shaft 53 joined to an output shaft of the engine 11 and an output shaft 54 jointed to the hydraulic transmission gearbox 55. The torque converter 52 has installed therein a pump impeller 71 (i.e., a fluid coupling), turbine runner 72, and a stator 73 disposed between the pump impeller 71 and the turbine runner 72. The pump impeller 71 faces the turbine runner 72 and connects with the input shaft 53 of the torque converter 52. The turbine runner 72 connects with the output shaft 54 of the torque converter 52. The stator 73 works to rectify the torque converter oil.

The torque converter 52 also includes a lock-up clutch 56 which works to selectively establish or release engagement of the output shaft 54 with the input shaft 53. The torque converter 52 works to transmit engine torque to driven wheels (i.e., front or rear wheels) of the automotive vehicle through a gear train such as a planetary gear train of the transmission gearbox 55.

The transmission gearbox 55 includes clutches C0, C1, and C2 and brakes B0 and B1. A selected speed or gear ratio is established by hydraulically controlling engagement and disengagement of the clutches C0, C1, and C2 and the brakes B0 and B1 to change a combination of gears through which the torque is to be transmitted. FIG. 4 shows operative relations between the gear ranges of the automatic transmission 51 (i.e., the positions of the gear shift lever 65 and shifted speeds: first to fourth speeds) and operative conditions of frictional elements (i.e., the clutches C0, C1, and C2 and the brakes B0 and B1). "○" indicates the clutches C0, C1, and C2 and brakes B0 and B1 placed in engagement in a selected one of the gear ranges to establish the transmission of engine torque. For example, when the accelerator pedal 26 is depressed in a drive (D) range of the automatic transmission 51, the automatic transmission 51 makes upshifts, in sequence, from the first to the second, to the third, and to the fourth speed as the speed of the vehicle increases. The upshift from the first to the second speed is achieved by keeping the clutch C0 engaged while disengaging the brake B0 and engaging the brake B1. The upshift from the second to third speed is achieved by keeping the clutch C0 engaged while disengaging the brake B1 and also engaging the clutch C2. The upshift from the third to fourth speed is achieved by keeping the clutch C2 engaged while disengaging the clutch C0 and engaging the brake B1.

If the hydraulic pressure supplied to the brake B1 has failed to be decreased for some reason during the shift from the second to third speed so that, so that the brake B1 is kept engaged, it will result in an interlock in the automatic transmission 51 upon engagement of the clutch C2, thus locking the driven wheels. To avoid this, a failsafe mechanism is installed in the transmission gearbox 55. The failsafe mechanism is made up of hydraulic pressure switches (not shown) each of which is installed in a place where the hydraulic pressure acting on one of the clutches C0 to C2 and the brakes B0 and B1 in the transmission gearbox 55 can be detected. Each of the hydraulic pressure switches is designed to be turned on to output a high-level signal when the detected hydraulic pressure is higher than a given pressure threshold level while being turned off to output a low-level signal when the detected hydraulic pressure is lower than the given pressure threshold level. The AT-ECU 70 analyzes the outputs of the hydraulic pressure switches and hydraulic pressure control signals outputted to an automatic shift control circuit 60 and determines whether each of the outputs of the hydraulic pressure switches matches a corresponding one of the hydraulic pressure control signals or not to diagnose failures of the clutches C0 to C1 and the brakes B0 and B1. The AT-ECU 70 analyzes results of the diagnosis and controls one(s) of the clutches C0 to C2 and the brakes B0 and B1 to inhibit a gear shift to one of the speeds at which the interlock will occur.

Referring back to FIG. 2, the transmission gearbox 55 has installed therein a hydraulic pump 58 driven by the output of the engine 11. A hydraulic control circuit 57 is installed in an oil pan (not shown) within which working fluid is stored. The hydraulic control circuit 57 consists of a line pressure control circuit 59, the automatic shift control circuit 60, a lock-up control circuit 61, and a manual selector valve 66. The working fluid pumped by the hydraulic pump 58 out of the oil pan is supplied to the automatic shift control circuit 60 and the lock-up control circuit 61 through the line pressure control circuit 59. The line pressure control circuit 59 has installed therein a hydraulic control valve (not shown) which works to adjust the pressure of the working fluid from the hydraulic pump 58 to a selected line pressure. The automatic shift control circuit 60 has installed therein a plurality of hydraulic control valves 90 which work to control the pressures of the working fluid to be supplied to the clutches C0, C1, and C2 and the brakes B0 and B1 of the transmission gearbox 55. The lock-up control circuit 61 has installed therein a hydraulic control valve (not shown) which works to control the pressure of the working fluid to be supplied to the lock-up clutch 56. The hydraulic circuit in the automatic shift control circuit 60 in which the hydraulic control valves 90 are installed is of a typical one. Japanese Patent First Publication No. 2002-130460 discloses such a structure, the disclosure of which is incorporated herein by reference.

Each of the hydraulic control valves 90 of the automatic shift control circuit 60 and the hydraulic control valve of the lock-up control circuit 61 is implemented by, for example, a linear solenoid valve which is responsive to a pulse voltage applied at a selected duty cycle and energizes a coil installed therein to produce a magnetic attraction pulling a valve body for controlling the hydraulic pressure.

The manual selector valve 66 is disposed between the line pressure control circuit 59 and the automatic shift control circuit 60 to select one or some of hydraulic supply lines to establish hydraulic communications with a corresponding one or ones of the hydraulic control valves 90 of the automatic shift control circuit 60 in response to a shifting motion of the gear shift lever 65. Specifically, the manual selector valve 66 works to establish the hydraulic communications between the hydraulic supply line and the hydraulic control valves 90 leading to the clutches C0 and C2 and the brakes B0 and B1 required to establish forward gear ratios (i.e., forward speeds) when the gear shift lever 65 is placed in the D position. When the gear shift lever 65 is shifted to P (Parking) or N (Neutral) position, the manual selector valve 66 selects the hydraulic pressure to be supplied to the transmission gearbox 55 which brings the transmission gearbox 55 into a neutral position even if the hydraulic control valves 90 of the automatic shift control circuit 60 are de-energized.

An engine speed sensor 24 is installed on the engine which measures an engine speed Ne. The transmission gearbox 55 also includes an input shaft speed sensor 68 and an output shaft speed sensor 69. The input shaft speed sensor 68 works to measure an input shaft speed Nt (i.e., the speed of the output shaft 54 of the torque converter 52 that is the speed of the turbine runner 72). The output shaft speed sensor 69 works to measure an output shaft speed No of the transmission gearbox 55.

Outputs of the engine speed sensor 24, the input shaft speed sensor 68, and the output shaft speed sensor 69 are inputted to the AT-ECU 70. The AT-ECU 70 is implemented by a microcomputer and executes gear shift programs installed in a ROM to control energization of the hydraulic control valves 90 of the automatic shift control circuit 60 and regulates the hydraulic pressure acting on the clutches C0, C1, and C2 and the brakes B0 and B1 of the transmission gearbox 55 to establish or release the engagement thereof, as illustrated in FIG. 4, in response to a gear shift request produced based on the position of the gear shift lever 65 and vehicle running conditions (e.g., throttle position, vehicle speed, etc.), thereby establishing a target gear ratio in the transmission gearbox 55 selected according to a given shift schedule.

Figure 6:
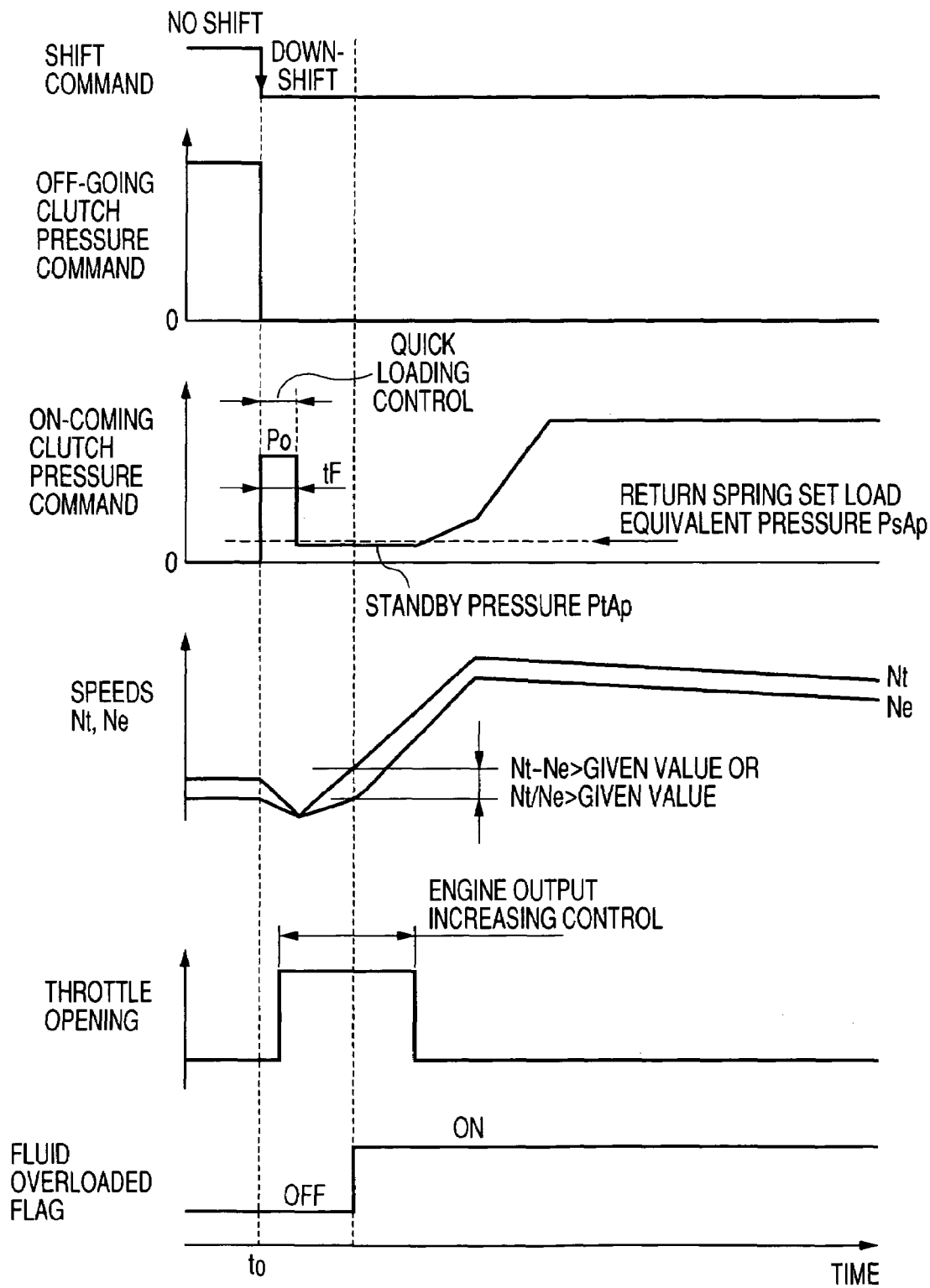
FIG. 6 is a timechart which shows operations of the engine control system of FIG. 1 when a transmission gearbox is downshifted to decelerate a vehicle in the first embodiment of the invention.

The AT-ECU 70 also works to make a downshift, as demonstrated in FIG. 6, in the automatic transmission 51 in response to a driver's deceleration request to produce the engine braking. In the following discussion, the clutches C0, C1, and C2, and the brakes B0 and B1 each will be referred to as a clutch for the sake of explanation. One of the clutches to be switched from an engaged to a disengaged position by downshift control will be referred to as an off-going clutch, while one to be switched from the disengaged to the engaged position by the downshift control will be referred to as an on-coming clutch.

FIG. 6 is a timechart demonstrating an example of control of a downshift working to set up the engine brake in response to a driver's deceleration request. In the following discussion, such a downshift will be referred to as a deceleration downshift or engine-braking downshift below.

When the AT-ECU 70 outputs a downshift command to set up the deceleration downshift at time t0, a hydraulic pressure command value indicating the hydraulic pressure to be charged or loaded to the off-going clutch is decreased quickly to one indicating a minimum pressure level (i.e., 0 kPa) or near it to lower the hydraulic pressure acting on the off-going clutch to one below a level equivalent to a lower limit of a torque transmission capacity of the off-going clutch (i.e., a lower limit of the hydraulic pressure required to establish the transmission of torque through the off-going clutch) to cause the off-going clutch to slip.

Additionally, at time t0 the downshift command has been outputted, the hydraulic pressure command value for the on-coming clutch is set to one indicating a given loading pressure Po (will also be referred to as a hydraulic pressure command value Po below) to commence quick loading control to load the working fluid into the on-coming clutch quickly or a higher rate. When the quick loading control has been performed for a given period of time tF, and the time just before the on-coming clutch starts to be engaged has been reached, the hydraulic pressure command value for the on-coming clutch is decreased to a standby hydraulic pressure PtAd selected around a hydraulic pressure PsAp equivalent to a set load of a return spring of the on-coming clutch. The quick loading control is then finished. This keeps the on-coming clutch in a position required to produce a desired amount of engine braking.

Subsequently, when a gear shifting percentage SftR [=100×(input shaft speed Nt−output shaft speed No×a before-shift gear ratio)/(output shaft speed No×after-shift gear ratio−output shaft speed No×before-shift gear ratio)] representing the degree of gear shifting (i.e., downshifting) reaches a given value, the AT-ECU 70 starts to increase the hydraulic pressure command value for the on-coming clutch at a constant rate. Subsequently, at a time when the deceleration downshift has been almost completed, the hydraulic pressure command value for the on-coming clutch is changed to a maximum one to increase the hydraulic pressure acting on the on-coming clutch to a maximum level. Specifically, when the input shaft speed Nt is rising to a speed corresponding to a lower speed to be established by the downshift, the AT-ECU 70 increases the hydraulic pressure to achieve the engagement of the on-coming clutch and completes the downshift.

During the above deceleration downshift action, the engine ECU 25 works to perform engine output increasing control when the following conditions are met. During dropping of an actual pressure acting on the off-going clutch drops to the minimum level (i.e., 0), the torque transmission capacity of the off-going clutch drops, and the input shaft speed Nt (i.e., the speed of the input shaft of the transmission gearbox 55) drops. When the amount of drop in the input shaft speed Nt from the start of the deceleration downshift action has exceeded a set value, the AT-ECU 70 determines that the actual pressure on the off-going clutch has dropped to a level equivalent to a value of the torque transmission capacity at which the driver would usually be insensitive to increasing of the engine power and not feel acceleration of the vehicle and commences the engine output increasing control in the following manner.

The engine ECU 25 outputs a throttle opening command indicating a selected amount by which the throttle valve 15 is to be opened and starts to control the throttle valve 15. The engine ECU 25 also turns off a fuel cut flag (will also be referred to as an F/C flag below) to terminate a fuel-cut in the engine 11 and resume fuel injection control to inject the fuel into the injectors 20 of the engine 11. This causes the engine speed Ne to rise, so that the input shaft speed Nt rises.

During the engine output increasing control, the engine ECU 25 determines whether a termination time to terminate the increasing of power of the engine 11 under the engine output increasing control when the downshift is completed, that is, when the gear shifting percentage SftR reaches 100% has been reached or not and keeps a given amount of increase in the power of the engine 11 constant. When the engine output increasing termination condition to terminate the engine output increasing control is met, that is, when it is determined that the termination time has been reached, the engine ECU 25 turns on the F/C flag to resume the fuel cut in the engine 11. However, if there is no request of the fuel cut from the engine 11 due to a sudden drop in speed of the engine 11 or any other reasons, the engine ECU 25 keeps the F/C flag off.

Further, during the engine output increasing control, a determination is made whether the amount of the working fluid having been charged or loaded to the on-coming clutch (will also be referred to as a quickly loaded fluid amount below) under the quick loading control is excessive or not based on a difference between the input shaft speed Nt and the engine speed Ne (i.e., Nt−Ne) or an Nt-to-Ne ratio (i.e., Nt/Ne). When it is determined that the working fluid has been overloaded to the on-coming clutch, the AT-ECU 70 corrects a controlled parameter(s) (i.e., the time duration tF for which the quick loading control is executed and/or the hydraulic pressure control command value Po) to decrease the quickly loaded fluid amount. The use of the engine speed Ne in addition to the input shaft speed Nt enables the fact that the quickly loaded fluid amount is excessive which arises from a rise in the input shaft speed Nt caused by the engine output increasing control, not by completion of the loading of the working fluid to the on-coming clutch to be found accurately.

The above described deceleration downshift control and determination on the fluid overloaded condition of the on-coming clutch are accomplished by programs, as discussed below in FIGS. 7 to 9, executed in either of the AT-ECU 70 or the engine ECU 25.

Figure 7:
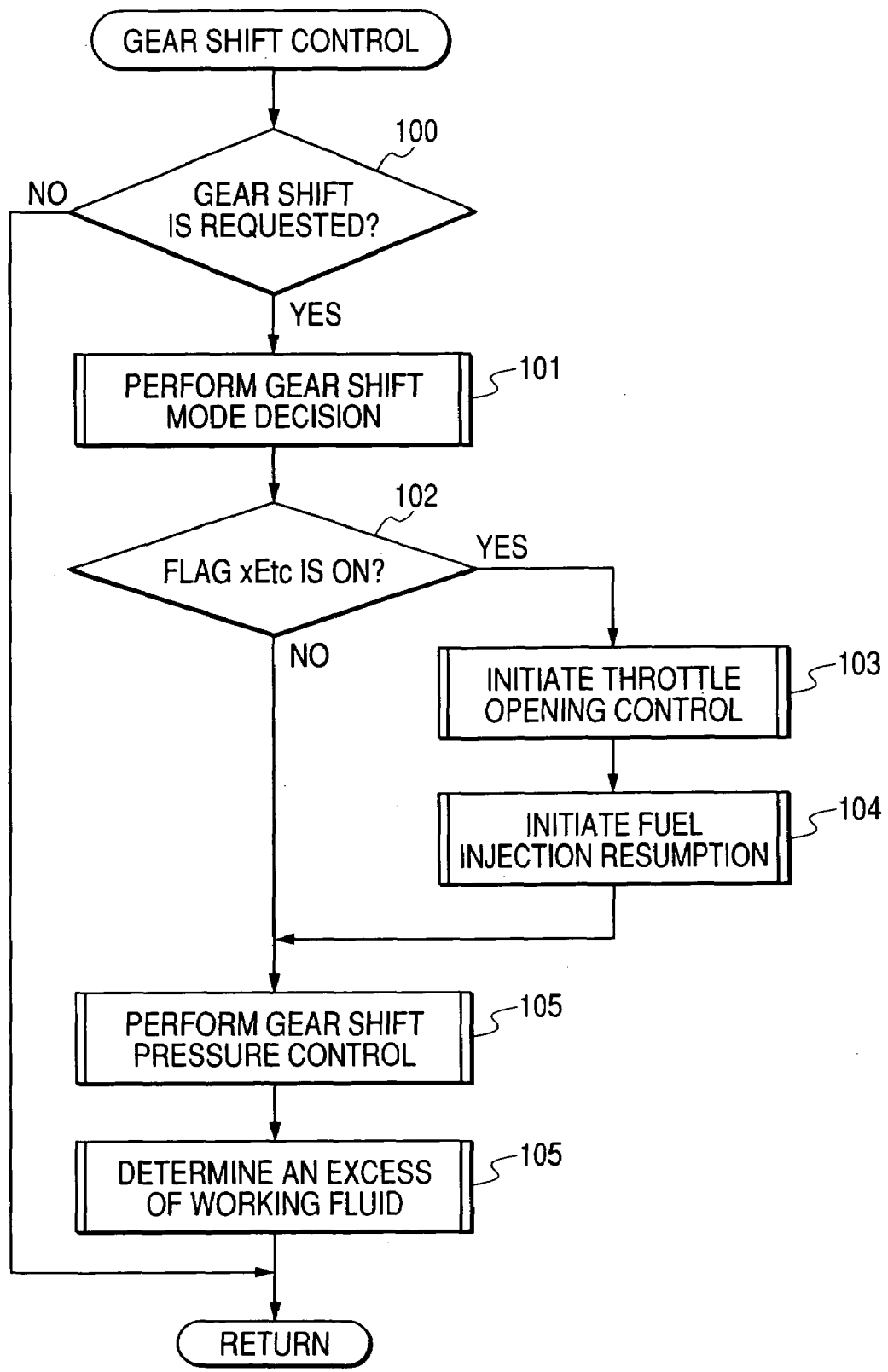
FIG. 7 is a flowchart of a sequence of logical steps to be executed to control a gear shift in an automatic transmission in the first embodiment of the invention.

FIG. 7 shows a gear shift control main program to be executed at an interval of, for example, 8 msec. to 32 msec. during running of the engine 11.

Upon entering the program, the routine proceeds to step 100 wherein it is determined whether a gear shift has been requested or nor, that is, whether a gear shift command has been outputted or not. If a NO answer is obtained meaning that the gear shift is not requested, then the routine terminates. Alternatively, if a YES answer is obtained, then the routine proceeds to step 101 wherein a gear shift mode decision program (not shown) is executed to find a gear shift mode, as requested by the gear shift command. For instance, U.S. application Ser. No. 11/207,195 teaches an example of the gear shift mode decision program, the disclosure of which is incorporated herein by reference.

The routine proceeds to step 102 wherein it is determined whether a deceleration downshift flag xEtc is set to ON or not which indicates that stated deceleration downshift requirements have been met. If a NO answer is obtained meaning that the deceleration downshift flag xEtc is set to OFF, then the routine proceeds to step 105 wherein a gear shift hydraulic pressure control program (not shown) is executed in the gear shift mode, as derived in step 101, to shift the gear of the automatic transmission 51 to that, as requested by the gear shift command. The routine then terminates.

If a YES answer is obtained instep 102 meaning that the deceleration downshift flag xEtc is set to ON, and the deceleration downshift requirements have been met, then the routine proceeds to step 103 wherein throttle opening control such as one, as disclosed in the above application, is initiated to bring the throttle valve 15 to a selected open position.

The routine the proceeds to step 104 wherein fuel injection resumption such as one, as disclosed in the above application, is initiated to resume the fuel injection to increase the output of the engine 11. The routine then proceeds to step 105, as described above.

Figure 8:
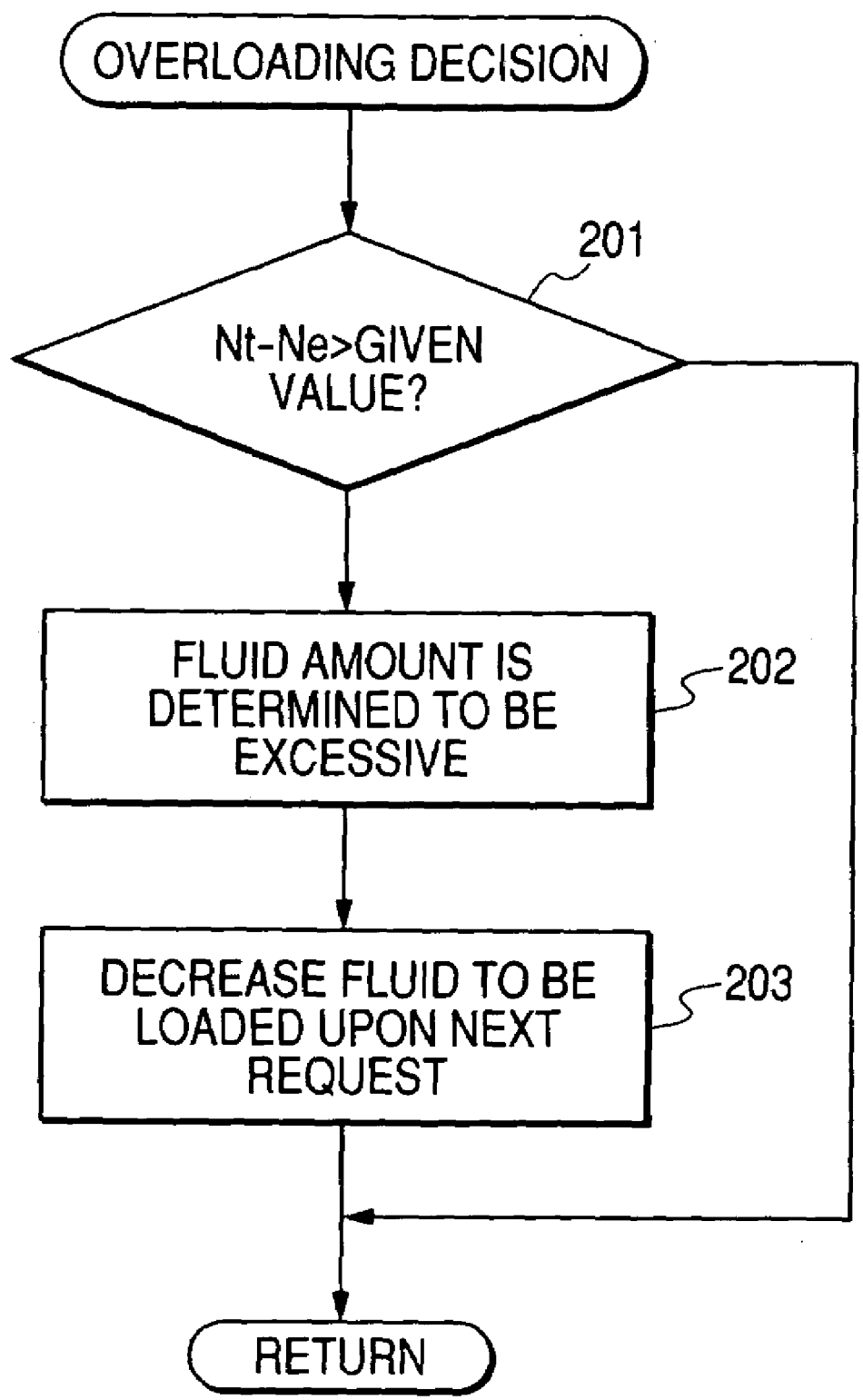
FIG. 8 is a flowchart of a program to be executed to determine whether the amount of working fluid loaded to an on-coming clutch is excessive or not to correct the amount of working fluid to be used during quick loading control to be executed upon a subsequence input of a downshift request in the first embodiment of the invention.

After step 105, the routine proceeds to step 106 to execute a sub-program, as illustrated in FIG. 8, to determine whether the working fluid is overloaded to the on-coming clutch or not.

Specifically, in step 201, it is determined whether a difference between the input shaft speed Nt and the engine speed Ne (i.e., Nt−Ne) is greater then a given value or not. If a NO answer is obtained meaning that the quickly loaded fluid amount is not excessive, then the routine terminates. Alternatively, if a YES answer is obtained, then the routine proceeds to step 202 wherein it is determined that the quickly loaded fluid amount is excessive, and a fluid overloaded flag is set to ON. The routine proceeds to step 203 wherein a controlled parameter(s) (i.e., the time duration tF for which the quick loading control is executed and/or the hydraulic pressure control command value Po) is corrected to decrease the amount of working fluid to be loaded to the on-coming clutch upon the next request of the deceleration downshift by a given amount.

Figure 9:
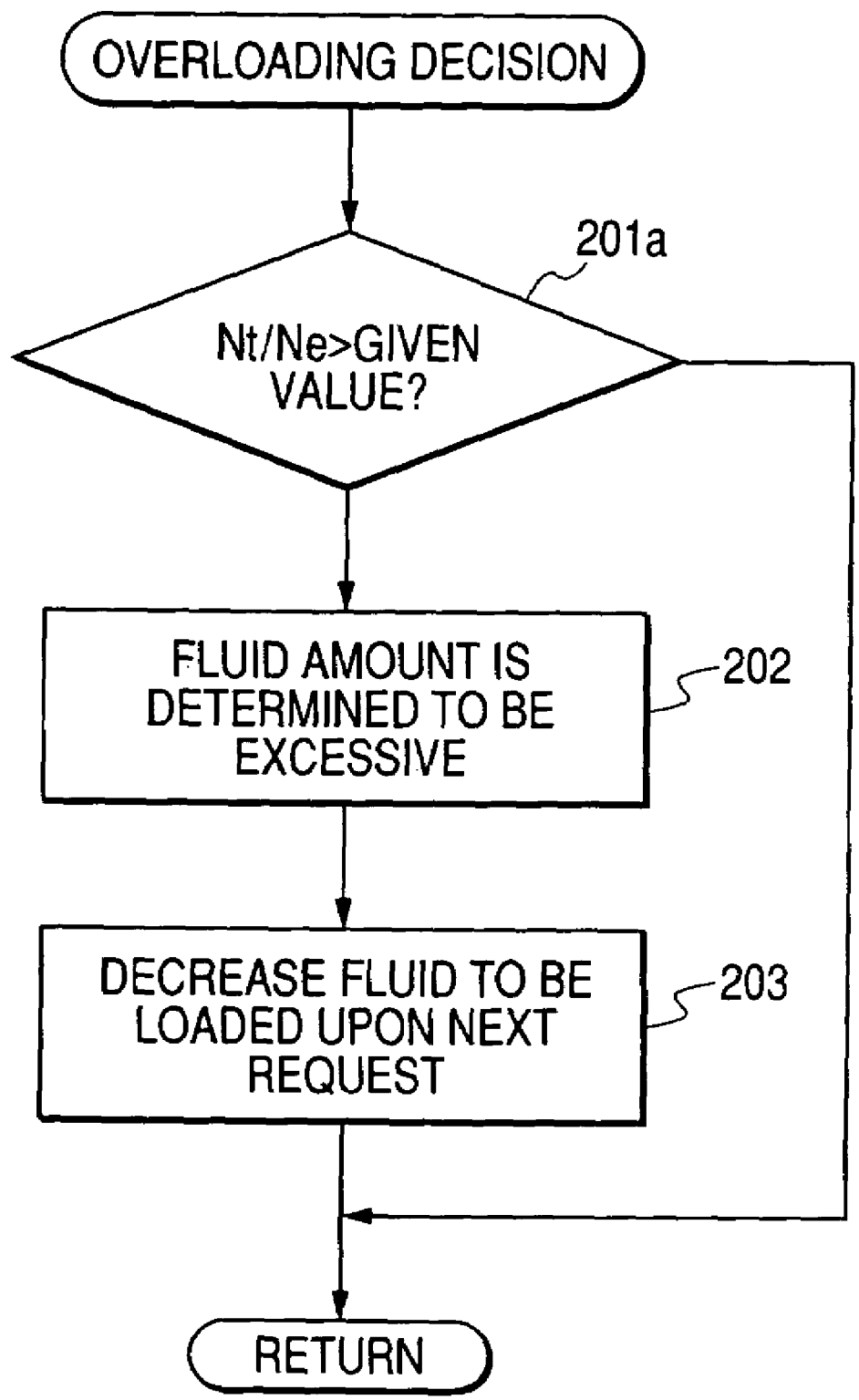
FIG. 9 is a flowchart of a program which is a modified form of the one of FIG. 8.

FIG. 9 shows a sub-program which may be executed in place of the one of FIG. 8. Specifically, in step 201a, it is determined whether it is determined whether a ratio of the input shaft speed Nt to the engine speed Ne (i.e., Nt/Ne) is greater than a given value or not. If a NO answer is obtained meaning that the quickly loaded fluid amount is not excessive, then the routine terminates. Alternatively, if a YES answer is obtained, then the routine proceeds to step 202 wherein it is determined that the quickly loaded fluid amount is excessive, and a fluid overloaded flag is set to ON Other steps are identical with those in FIG. 8, and explanation thereof in detail will be omitted here.

Figure 10:
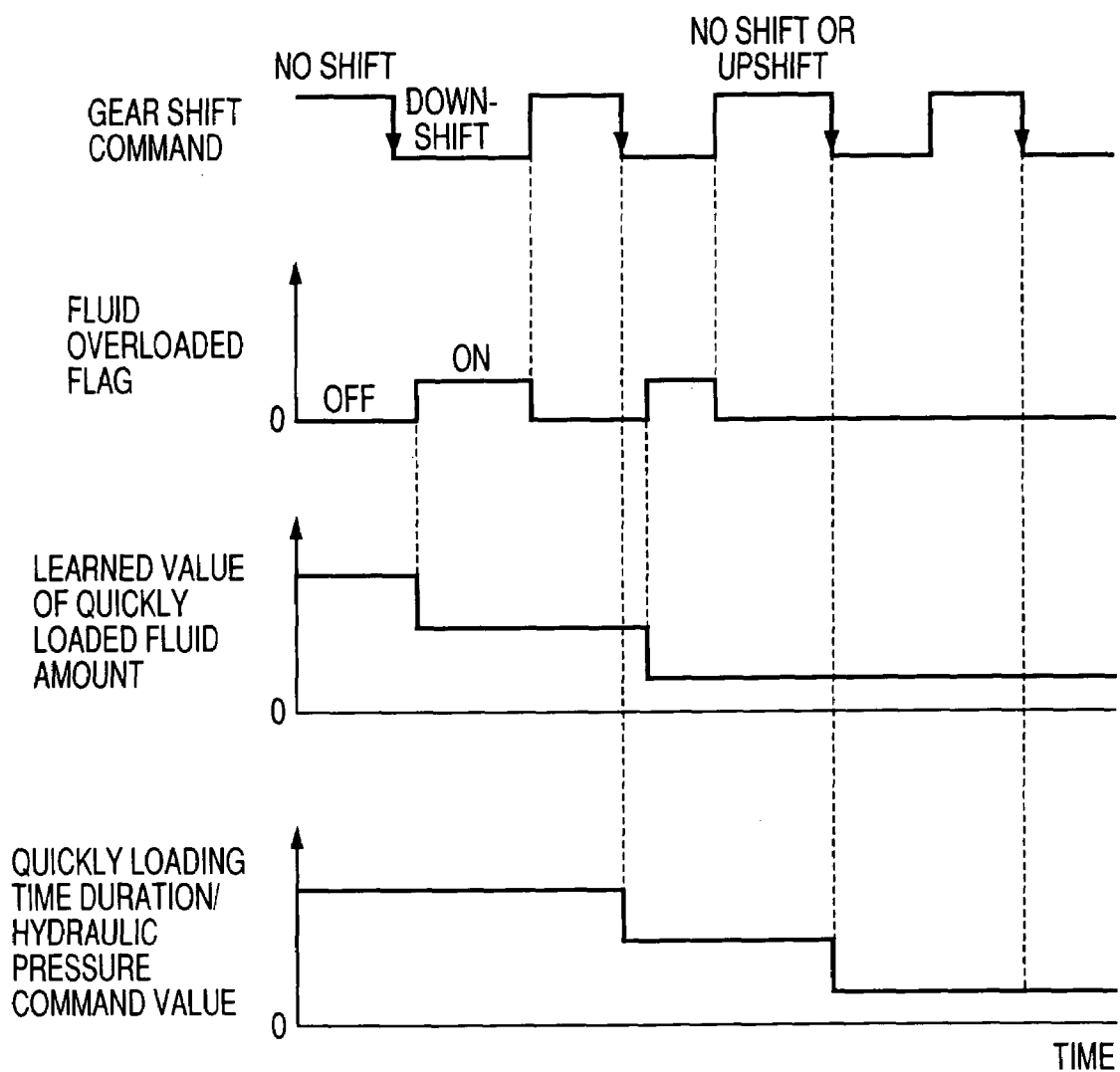
FIG. 10 is a timechart which demonstrates learning of the amount of working fluid to be loaded to an on-coming clutch quickly during a downshift in the first embodiment of the invention.

The above described quick loading control to control the amount of working fluid to be loaded to the on-coming clutch in the engine braking mode of the engine 11 will be discussed below with reference to a timechart of FIG. 10.

Each time the quickly loaded fluid amount is determined to be excessive during the deceleration downshift, and the fluid overloaded flag is set to ON, the AT-ECU 70 subtracts a preselected value from the quickly-loaded fluid amount to determine a value thereof to be loaded to the on-coming clutch upon the next request of the deceleration downshift. This learning correction is made by decrementing the time duration tF for which the quick loading control is to be executed and/or the hydraulic pressure control command value Po to determine the amount of working fluid to be loaded to the on-coming clutch upon the next request of the deceleration downshift, that is, upon the next output of the gear shift command.

As apparent from the above discussion, the engine control system of this embodiment is designed to use the difference between the input shaft speed Nt and the engine speed Ne or a ratio of Nt to Ne in finding the fact that the quickly loaded fluid amount is excessive. This enables such fact to be determined as having arisen from a rise in the input shaft speed Nt caused by the engine output increasing control, not by completion of the loading of the working fluid to the on-coming clutch.

When the quickly loaded fluid amount is determined to be excessive during execution of the deceleration downshift control, the AT-ECU 70 may alternatively determine an excess of working fluid loaded to the on-coming clutch as a function of a difference between the input shaft speed Nt and the engine speed Ne or a ratio of Nt to Ne and search a correction value, by which the time duration tF and/or the hydraulic pressure control command value Po is to be corrected, by look-up using a map or a given mathematical calculation based on the excess of working fluid. In other words, the time duration tF and/or the hydraulic pressure control command value Po may be modified as a function of the excess of working fluid loaded to the on-coming clutch, thereby correcting the amount of working fluid to be loaded to the on-coming clutch to a suitable one quickly.

The engine control system according to the second embodiment will be described below.

Figure 11:
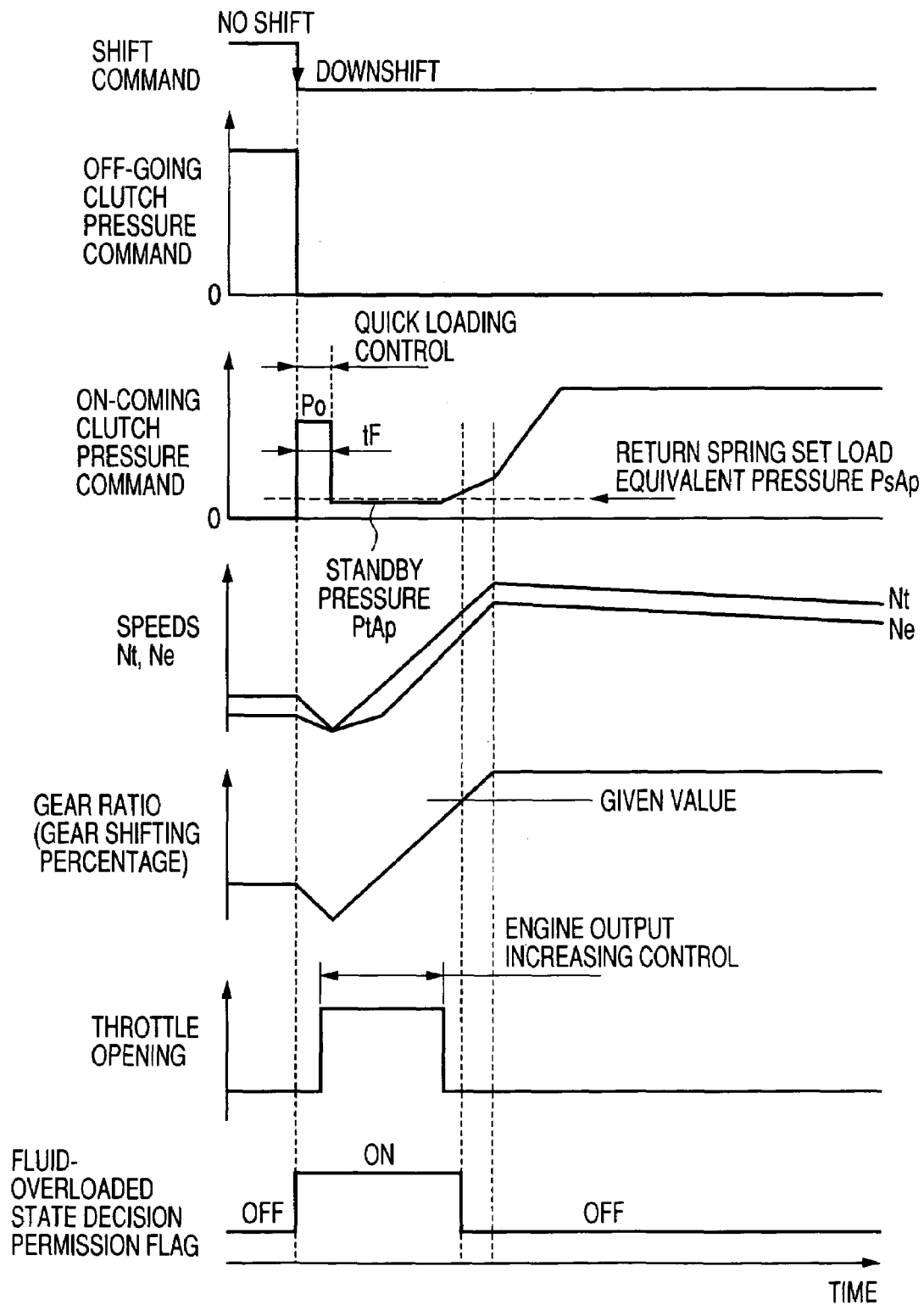
FIG. 11 is a timechart which demonstrates operations of an engine control system when a downshift is made to decelerate a vehicle in the second embodiment of the invention.

Usually, a lack of the quickly loaded fluid amount results in a quick rising of the input shaft speed Nt near the end of the downshift. This may contribute an error in determining the fluid-overloaded state of the on-coming clutch in the above first embodiment. In order to avoid this problem, the engine control system of this embodiment is, as shown in FIG. 11, designed to make a determination on the fluid-overloaded state of the on-coming clutch during a time when the gear shifting percentage SftR or the gear ratio of the transmission gearbox 55 (=the input shaft speed Nt/the output shaft speed No) is below a given value and inhibit the determination when such a parameter is above the given value.

Figure 12:
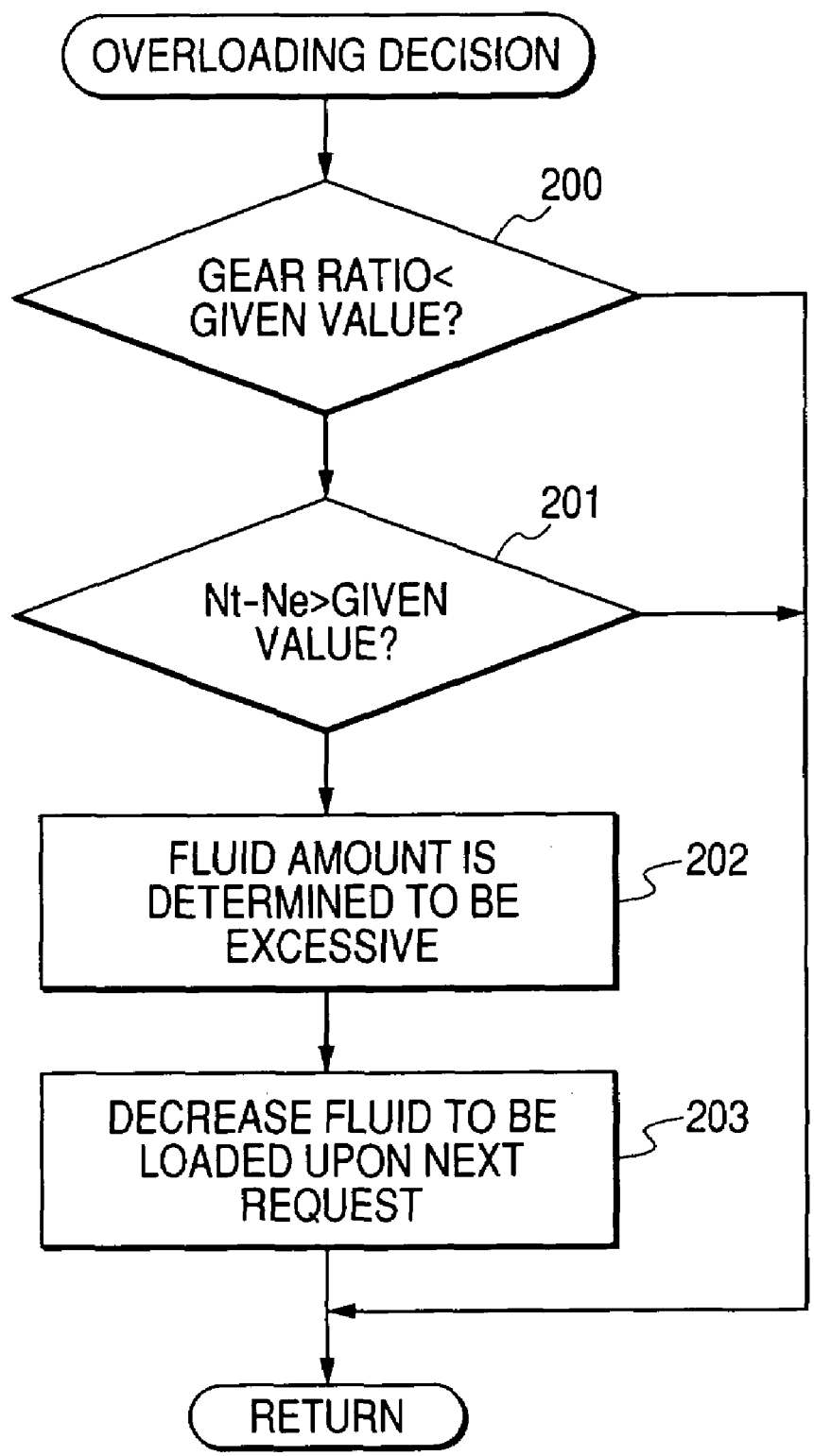
FIG. 12 is a flowchart of a program to be executed to determine whether the amount of working fluid loaded to an on-coming clutch is excessive or not to correct the amount of working fluid to be used during quick loading control to be executed upon a subsequence input of a downshift request in the second embodiment of the invention.
Figure 13:
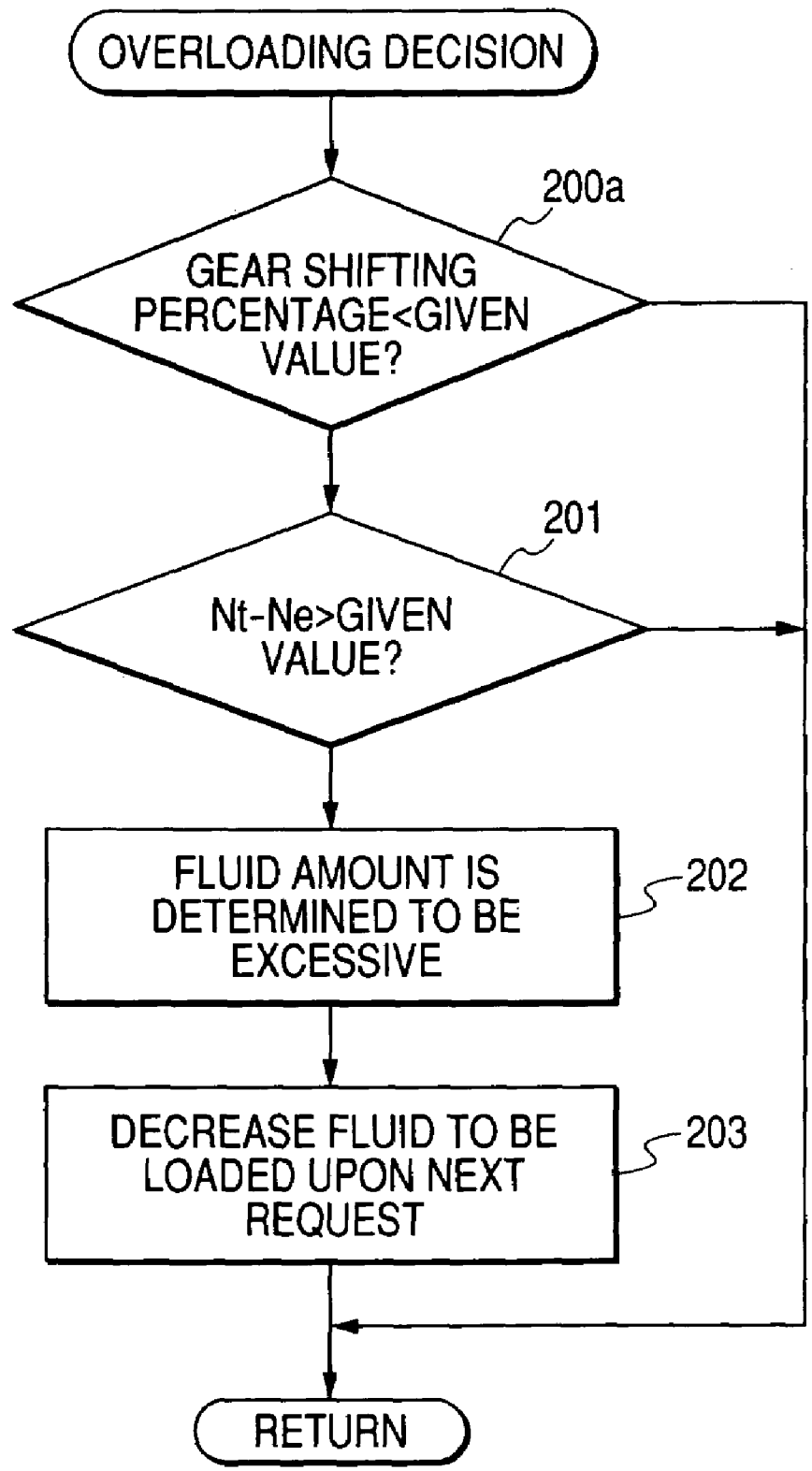
FIG. 13 is a flowchart of a program which is a modified form of the one of FIG. 12.

The AT-ECU 70 of this embodiment works to execute either of sub-programs, as illustrated in FIGS. 12 and 13, in step 106 of FIG. 7.

First, in step 200 of FIG. 12, it is determined whether the gear ratio (=the input shaft speed Nt/the output shaft speed No) is smaller than a given value or not. If a YES answer is obtained, a fluid-overloaded state decision permission flag is set to ON to permit the routine to proceed to following steps 201 to 203 for deciding whether the working fluid is overloaded to the on-coming clutch or not. Steps 201 to 203 are the same as those in FIG. 8, and explanation thereof in detail will be omitted here. Alternatively, if a NO answer is obtained in step 200, the fluid-overloaded state decision permission flag is set to OFF to inhibit the fluid-overloaded state decision from being made.

Instead of the sub-program of FIG. 12, one, as illustrated in FIG. 13 may be executed. In step 200a, it is determined whether the gear shifting percentage SftR is below a given value or not. If a YES answer is obtained, the fluid-overloaded state decision permission flag is set to ON to permit the routine to proceed to following steps 201 to 203 for deciding whether the working fluid is overloaded to the on-coming clutch or not. Alternatively, if a NO answer is obtained, the fluid-overloaded state decision permission flag is set to OFF to inhibit the fluid-overloaded state decision from being made.

Figure 14:
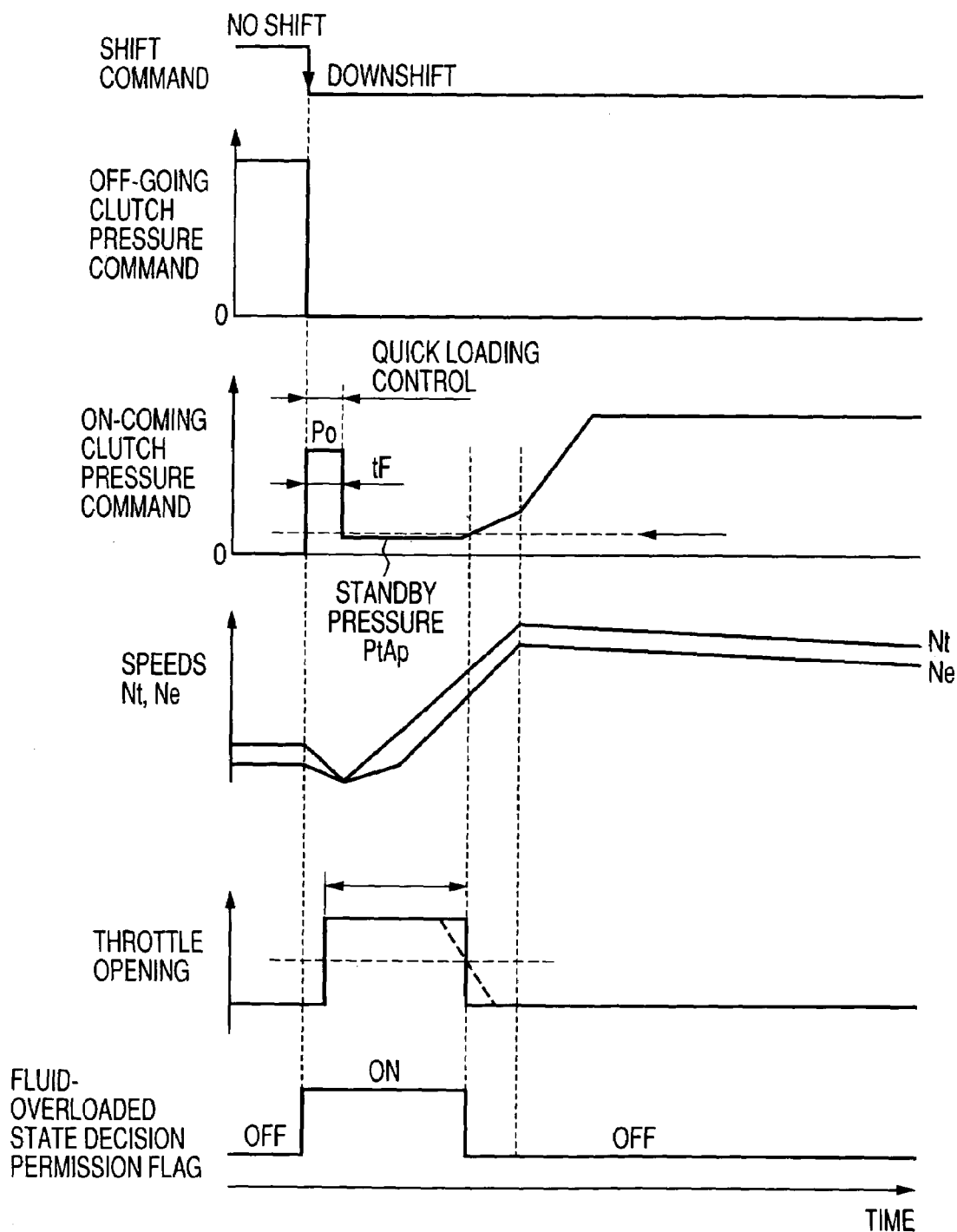
FIG. 14 is a timechart which demonstrates operations of an engine control system when a downshift is made to decelerate a vehicle in the third embodiment of the invention.

The engine control system according to the third embodiment will be described below which is designed to, as illustrated in FIG. 14, to permit the fluid-overloaded state decision to be made only when the throttle valve 15 is opened to at a given angle or more.

Figure 15:
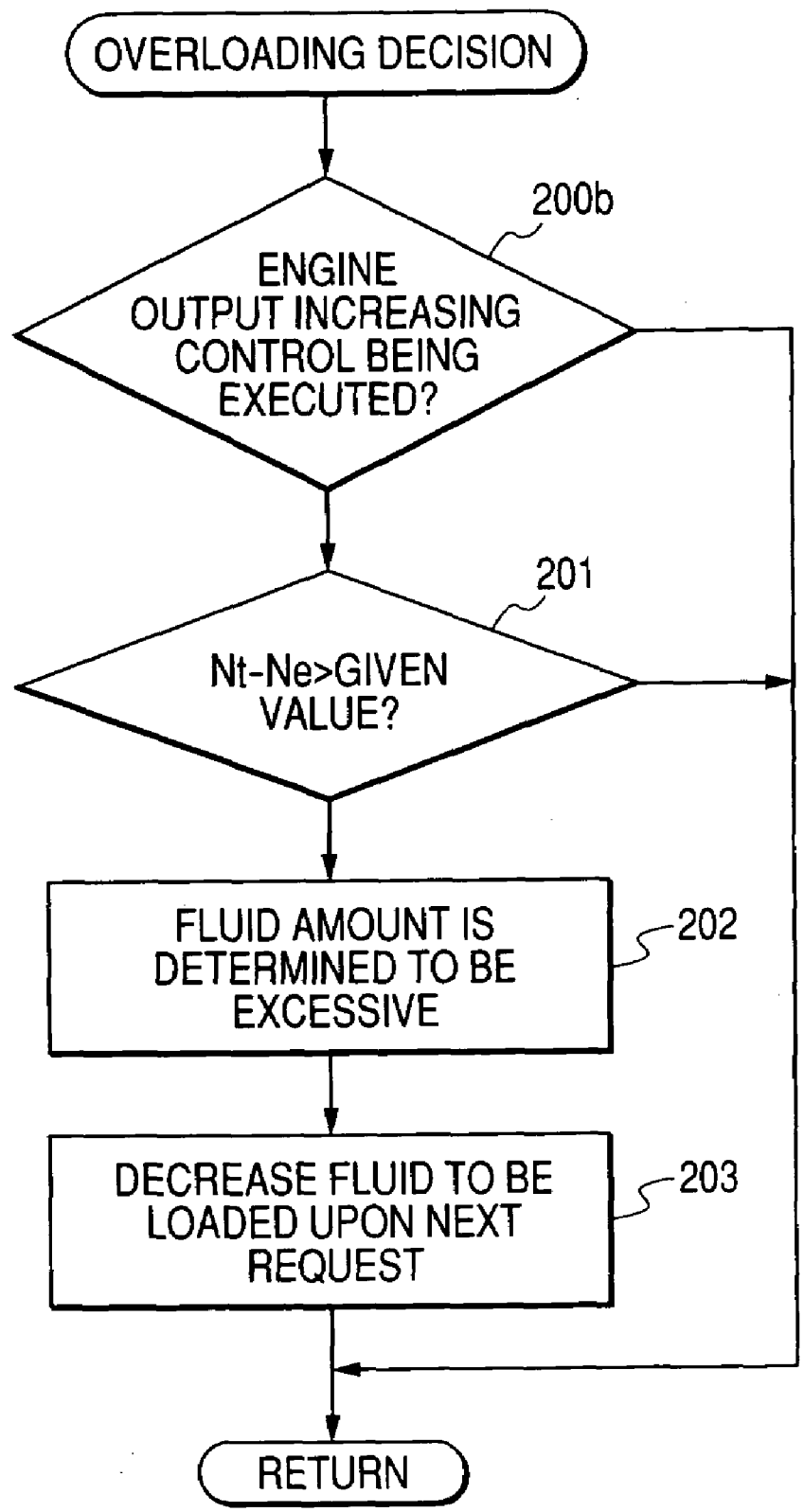
FIG. 15 is a flowchart of a program to be executed to determine whether the amount of working fluid loaded to an on-coming clutch is excessive or not to correct the amount of working fluid to be used during quick loading control to be executed upon a subsequence input of a downshift request in the third embodiment of the invention.
Figure 16:
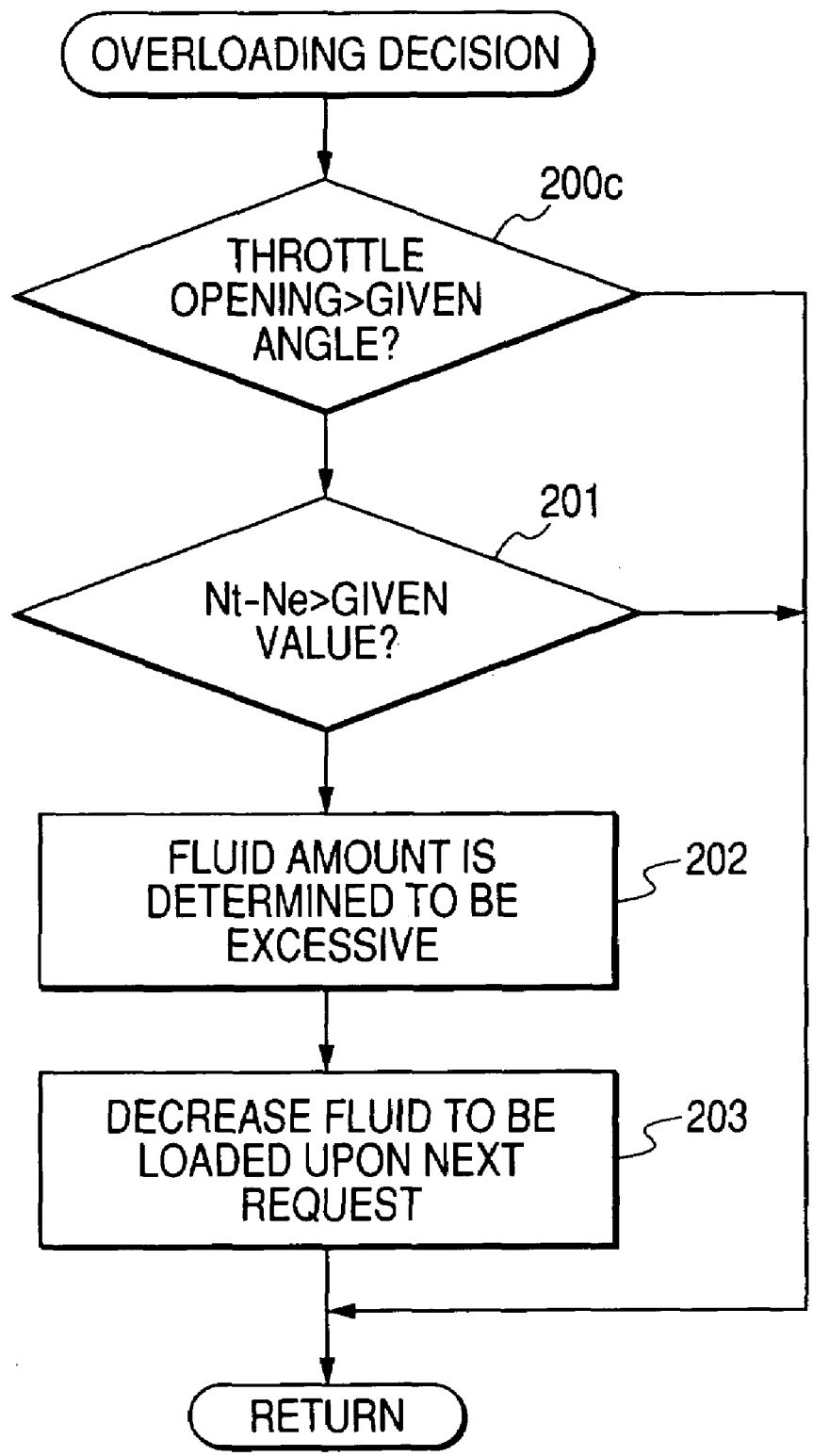
FIG. 16 is a flowchart of a program which is a modified form of the one of FIG. 15.
Figure 17:
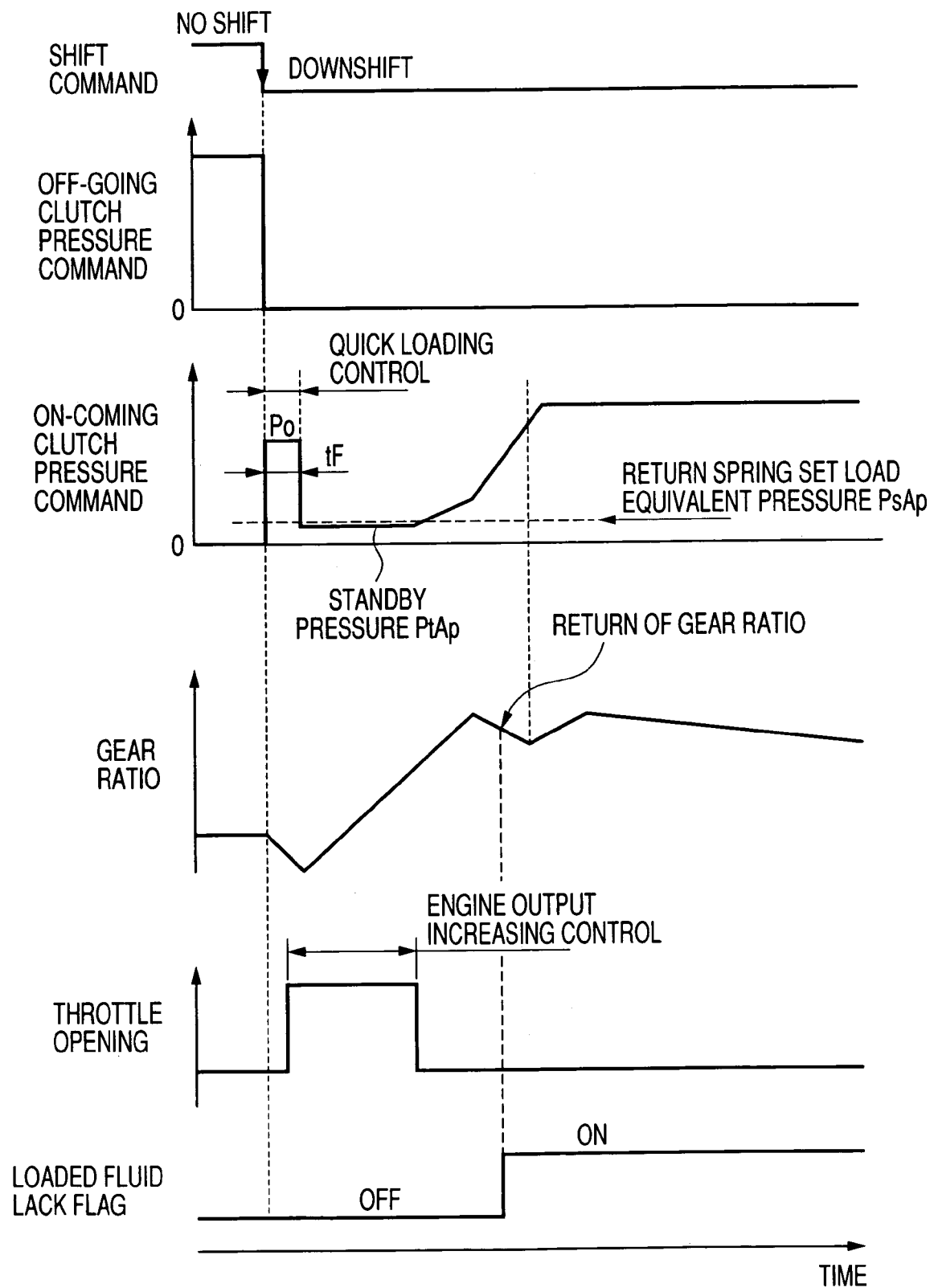
FIG. 17 is a timechart which demonstrates operations of an engine control system when a downshift is made to decelerate a vehicle in the fourth embodiment of the invention.

The AT-ECU 70 of this embodiment works to execute either of sub-programs, as illustrated in FIGS. 15 and 16, in step 106 of FIG. 7.

First, in step 200b of FIG. 15, it is determined whether the engine ECU 25 is now performing the engine output increasing control or not. If the fluid-overloaded state decision permission flag is set to ON to permit the routine to proceed to following steps 201 to 203 for deciding whether the working fluid is overloaded to the on-coming clutch or not. Steps 201 to 203 are the same as those in FIG. 8, and explanation thereof in detail will be omitted here. Alternatively, if a NO answer is obtained in step 200b, the fluid-overloaded state decision permission flag is set to OFF to inhibit the fluid-overloaded state decision from being made.

Instead of the sub-program of FIG. 15, one, as illustrated in FIG. 16 may be executed. In step 200c, it is determined whether the throttle valve 15 is opened at a given angle or more. If a YES answer is obtained, the fluid-overloaded state decision permission flag is set to ON to permit the routine to proceed to following steps 201 to 203 for deciding whether the working fluid is overloaded to the on-coming clutch or not. Alternatively, if a NO answer is obtained, the fluid-overloaded state decision permission flag is set to OFF to inhibit the fluid-overloaded state decision from being made.

Figure 18:
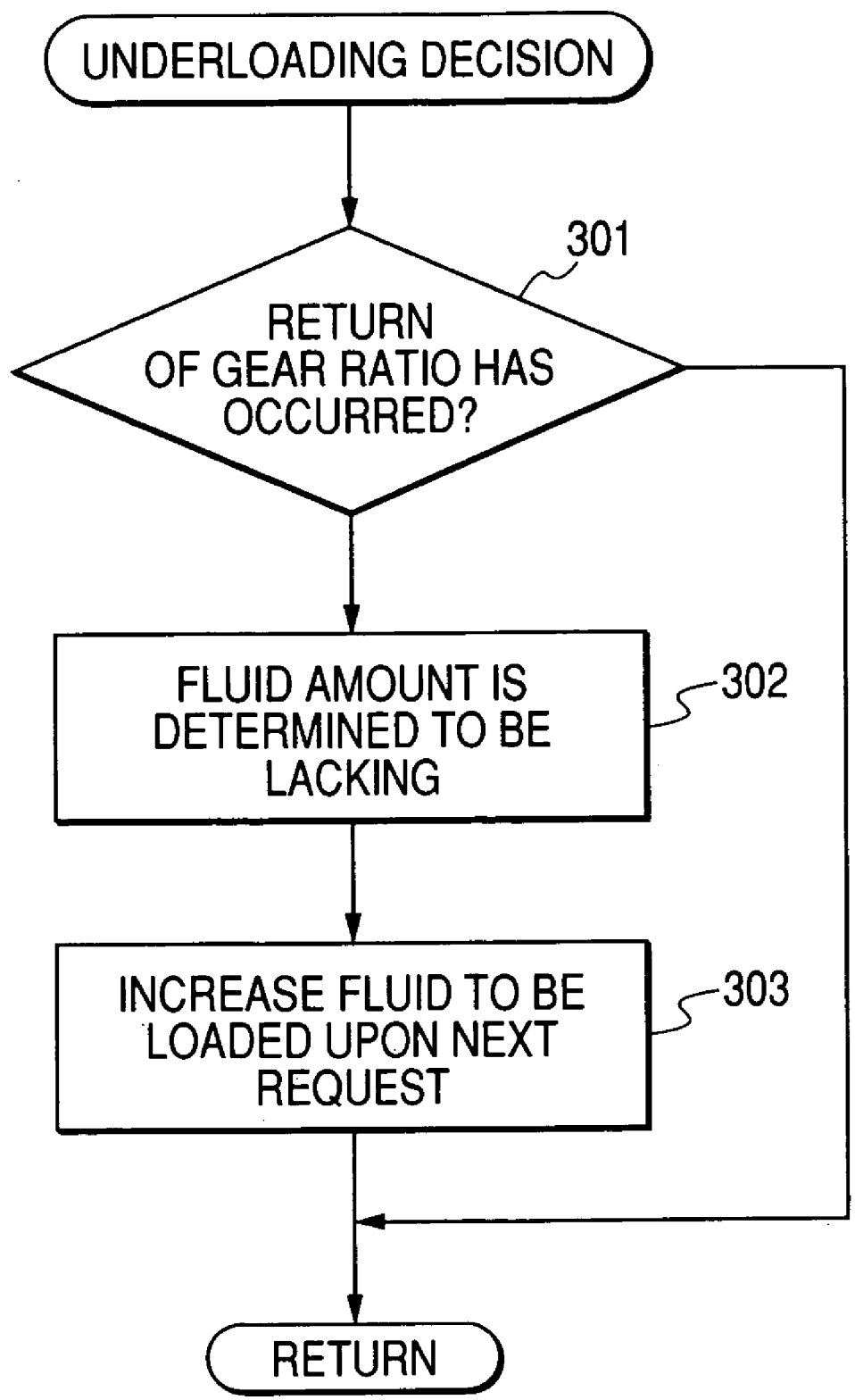
FIG. 18 is a flowchart of a program to be executed to determine whether the amount of working fluid loaded to an on-coming clutch is lacking or not to correct the amount of working fluid to be used during quick loading control to be executed upon a subsequence input of a downshift request in the fourth embodiment of the invention.

The engine control system according to the fourth embodiment will be described below which is designed to, as illustrated in FIG. 18, monitor a lack of amount of working fluid loaded to the on-coming clutch (i.e., a lack of the quickly loaded fluid amount).

The AT-ECU 70 of this embodiment works to execute a sub-program, as illustrated in FIG. 18, in step 106 of FIG. 7.

After entering the program, the routine proceeds to step 301 wherein it is determined whether a return of the gear ratio of the transmission gearbox 55 (or a return of the gear shifting percentage SftR) has occurred or not. If a NO answer is obtained, it is concluded that the quickly loaded fluid amount is not lacking. The routine then terminates. Alternatively, if a YES answer is obtained, then the routine proceeds to step 302 wherein it is determined that the quickly loaded fluid amount is lacking, and the a loaded-fluid lack flag is set to ON. The routine proceeds to step 303 wherein the controlled parameter(s) (i.e., the time duration tF for which the quick loading control is executed and/or the hydraulic pressure control command value Po) is corrected to increase the amount of working fluid to be loaded to the on-coming clutch upon the next request of the deceleration downshift by a given amount.

When the quickly loaded fluid amount is determined to be lacking during execution of the deceleration downshift control, the AT-ECU 70 may alternatively calculate the amount of lack of working fluid loaded to the on-coming clutch as a function of the amount of return of the gear ratio of the transmission gearbox 55 (or a return of the gear shifting percentage SftR) and search a correction value, by which the time duration tF and/or the hydraulic pressure control command value Po is to be corrected, by look-up using a map or a given mathematical calculation based on the calculated amount of lack of working fluid. This results in quick correction to bring the amount of working fluid to be loaded to the on-coming clutch to a suitable one.

Figure 19:
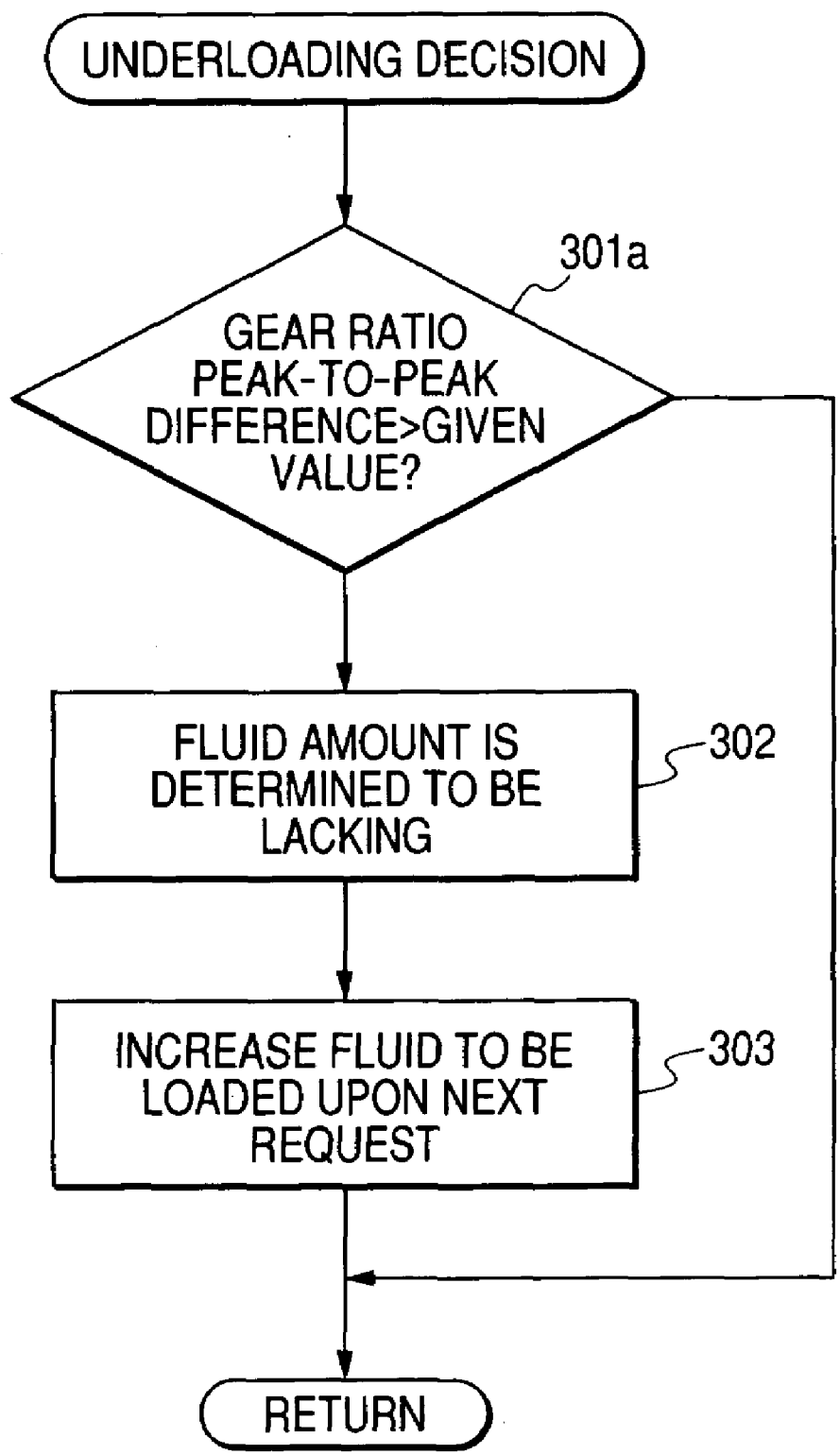
FIG. 19 is a flowchart of a program which is a first modified form of the one of FIG. 18.

FIG. 19 shows a modification of the sub-program of FIG. 18.

The AT-ECU 70 works to sample the peak of the gear ratio of the transmission gearbox 55 in a cycle of, for example, 10 msec. and store it during every deceleration downshift control.

After entering the program, the routine proceeds to step 301a wherein it is determined whether a difference between the peak of the gear ratio, as stored in the AT-ECU 70 one sampling cycle earlier, and that, as stored in the latest sampling cycle, is less than a given value or not to determine whether the peak is dropping or not. If a NO answer is obtained it is concluded that the quickly loaded fluid amount is not lacking. The routine then terminates. Alternatively, if a YES answer is obtained, then the routine proceeds to step 302 wherein it is determined that the quickly loaded fluid amount is lacking, and the loaded-fluid lack flag is set to ON. The routine proceeds to step 303 wherein the controlled parameter(s) (i.e., the time duration tF for which the quick loading control is executed and/or the hydraulic pressure control command value Po) is corrected to increase the amount of working fluid to be loaded to the on-coming clutch upon the next request of the deceleration downshift by a given amount.

Figure 20:
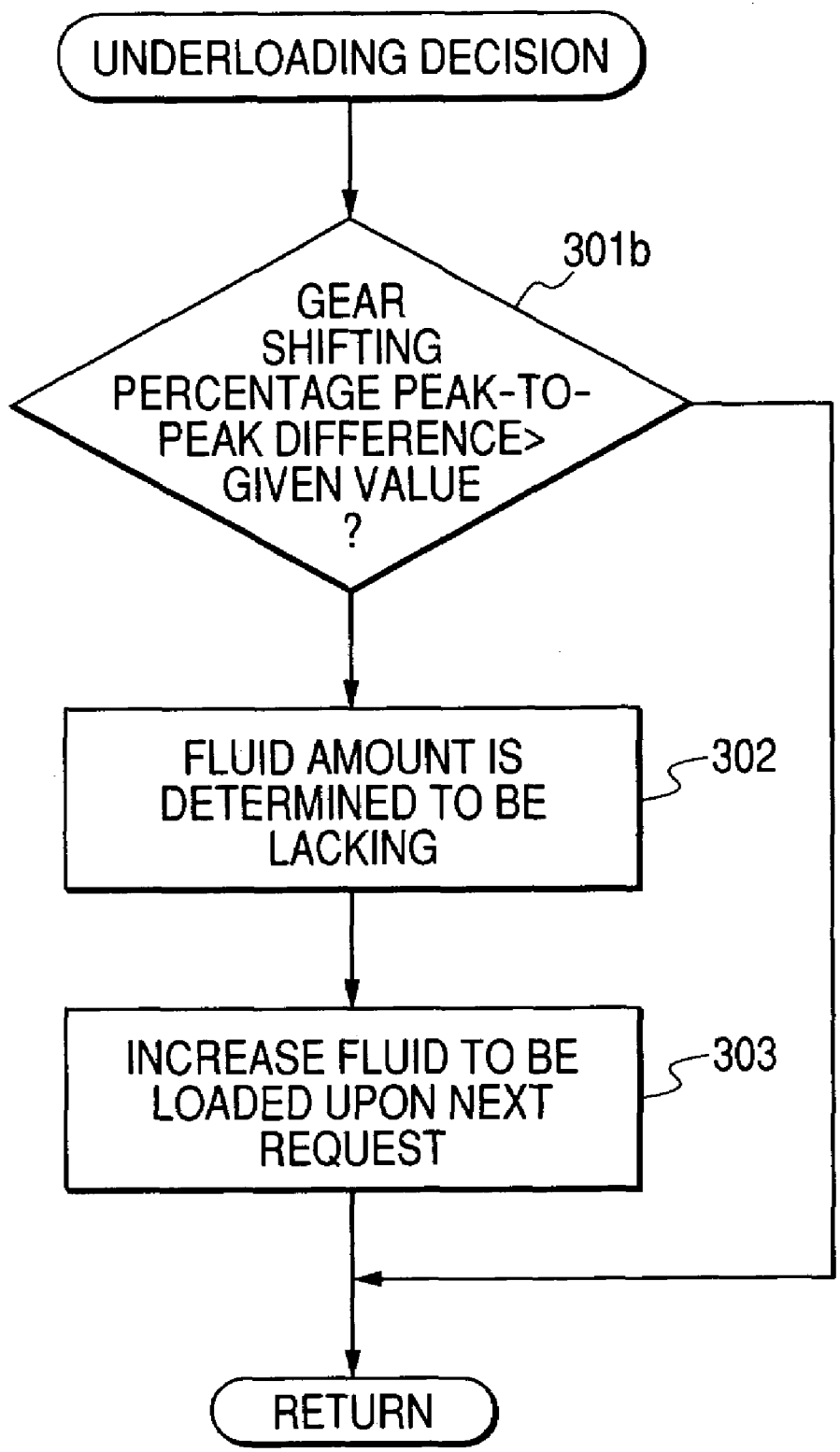
FIG. 20 is a flowchart of a program which is a second modified form of the one of FIG. 18.

FIG. 20 shows the second modification of the sub-program of FIG. 18.

The AT-ECU 70 works to sample the peak of the gear shifting percentage SftR in a cycle of, for example, 10 msec. and store it during every deceleration downshift control.

After entering the program, the routine proceeds to step 301b wherein it is determined whether a difference between the peak of the gear shifting percentage SftR, as stored in the AT-ECU 70 one sampling cycle earlier, and that, as stored in the latest sampling cycle, is less than a given value or not to determine whether the peak is dropping or not. If a NO answer is obtained it is concluded that the quickly loaded fluid amount is not lacking. The routine then terminates. Alternatively, if a YES answer is obtained, then the routine proceeds to step 302 wherein it is determined that the quickly loaded fluid amount is lacking, and the loaded-fluid lack flag is set to ON. Step 303 is the same as the one in FIG. 19, and explanation thereof in detail will be omitted here.

Figure 21:
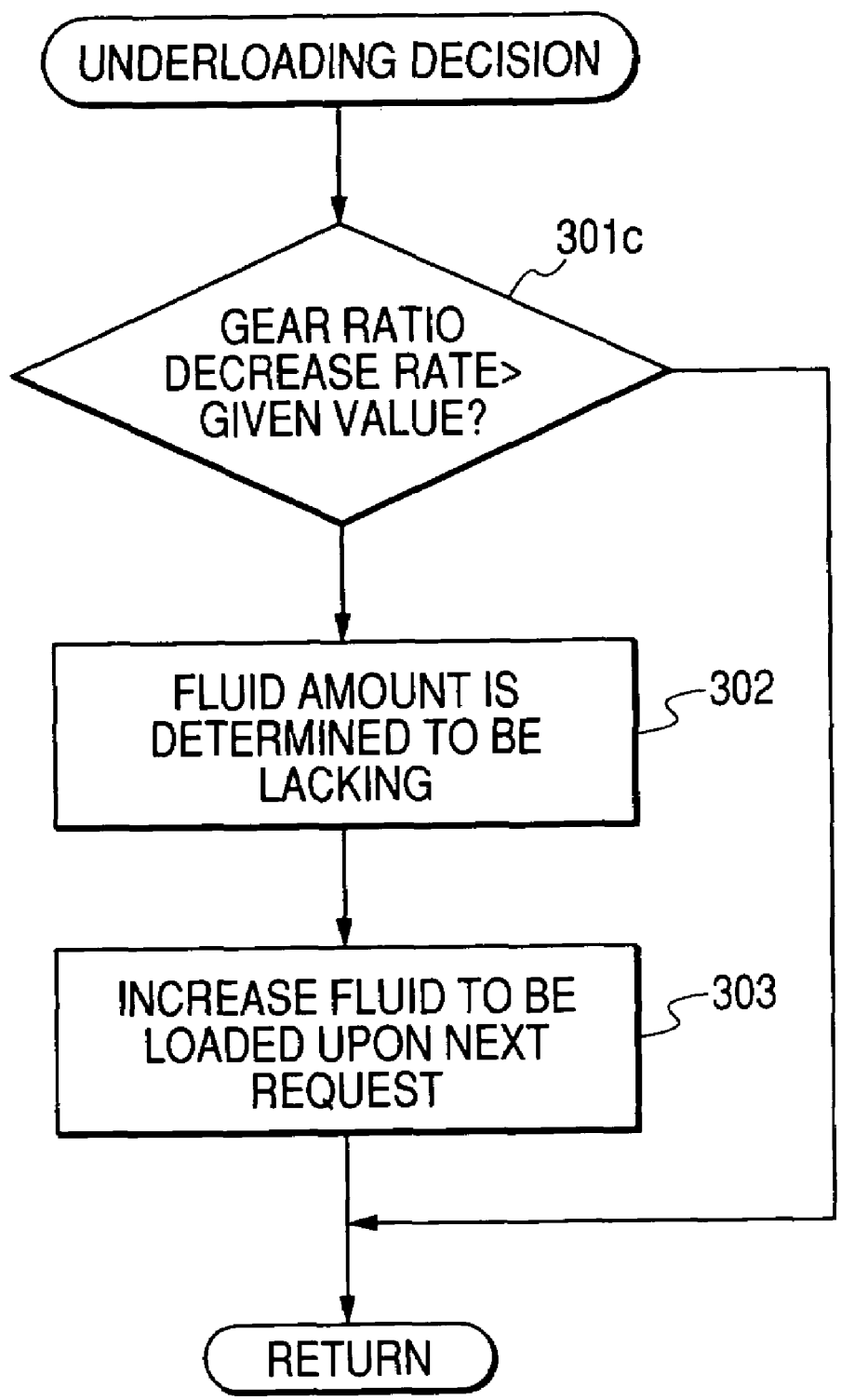
FIG. 21 is a flowchart of a program which is a third modified form of the one of FIG. 18.
Figure 22:
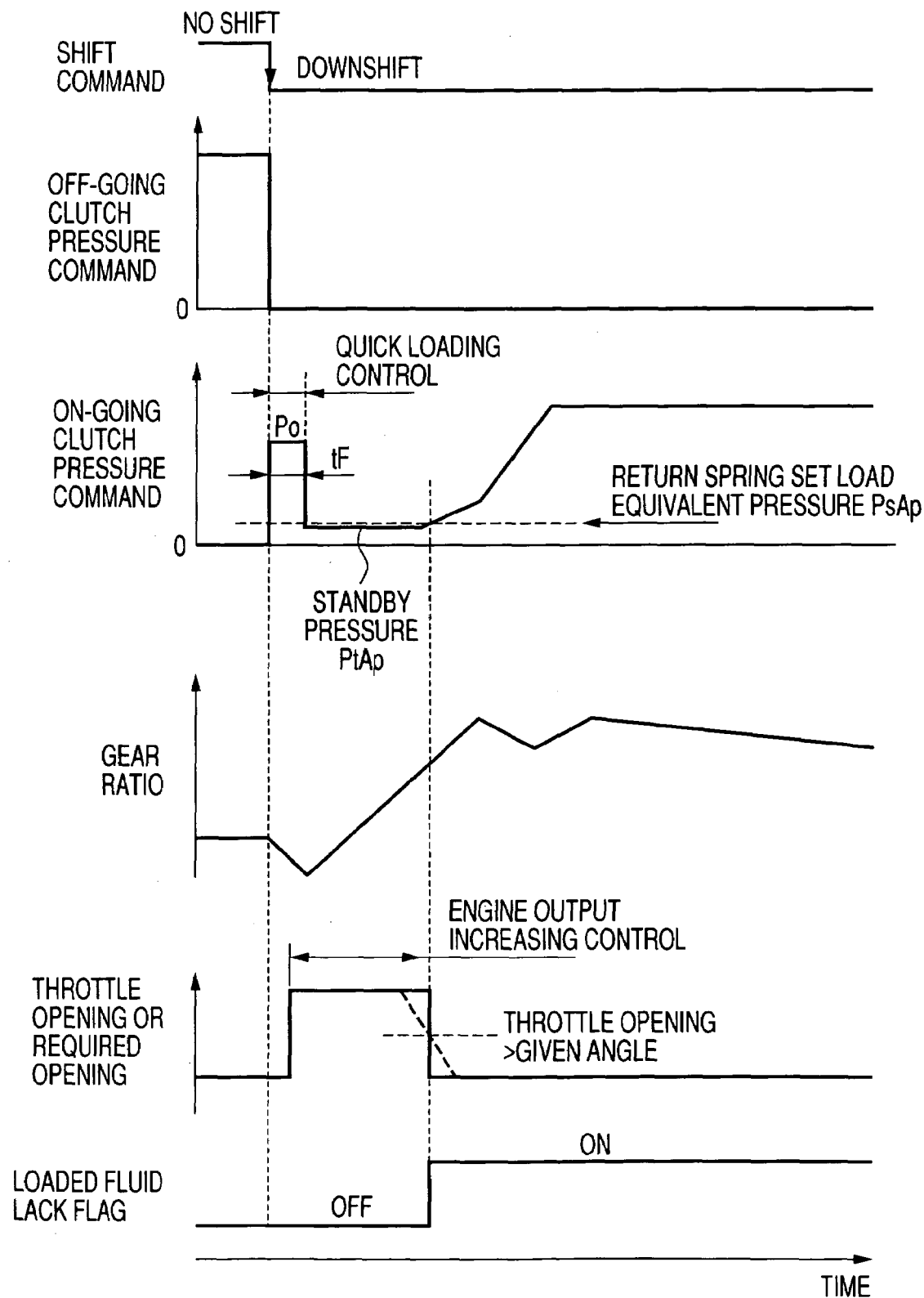
FIG. 22 is a timechart which demonstrates operations of an engine control system when a downshift is made to decelerate a vehicle in the fifth embodiment of the invention.

FIG. 21 shows the third modification of the sub-program of FIG. 18.

After entering the program, the routine proceeds to step 301c wherein it is determined whether the gradient or rate of decrease in the gear ratio of the transmission gearbox 55 (or the gear shifting percentage SftR during the deceleration downshift is greater than or equal to a given value. If a NO answer is obtained it is concluded that the quickly loaded fluid amount is not lacking. The routine then terminates. Alternatively, if a YES answer is obtained, then the routine proceeds to step 302 wherein it is determined that the quickly loaded fluid amount is lacking, and the loaded-fluid lack flag is set to ON. Step 303 is the same as the one in FIG. 18, and explanation thereof in detail will be omitted here.

The engine control system according to the fifth embodiment will be described below.

Usually, just after the start of the deceleration downshift control, the input shaft speed Nt and the engine speed Ne drop temporarily, thus resulting in a drop in the gear ratio (or the gear shifting percentage SftR which will contribute to an error in determining on the lack of working fluid loaded to the on-coming clutch.

In order to avoid this problem, the engine control system of this embodiment is designed to make the determination on the lack of working fluid loaded to the on-coming clutch only after the end of the engine output increasing control or after the throttle valve 15 is closed to a given angle or less.

Figure 23:
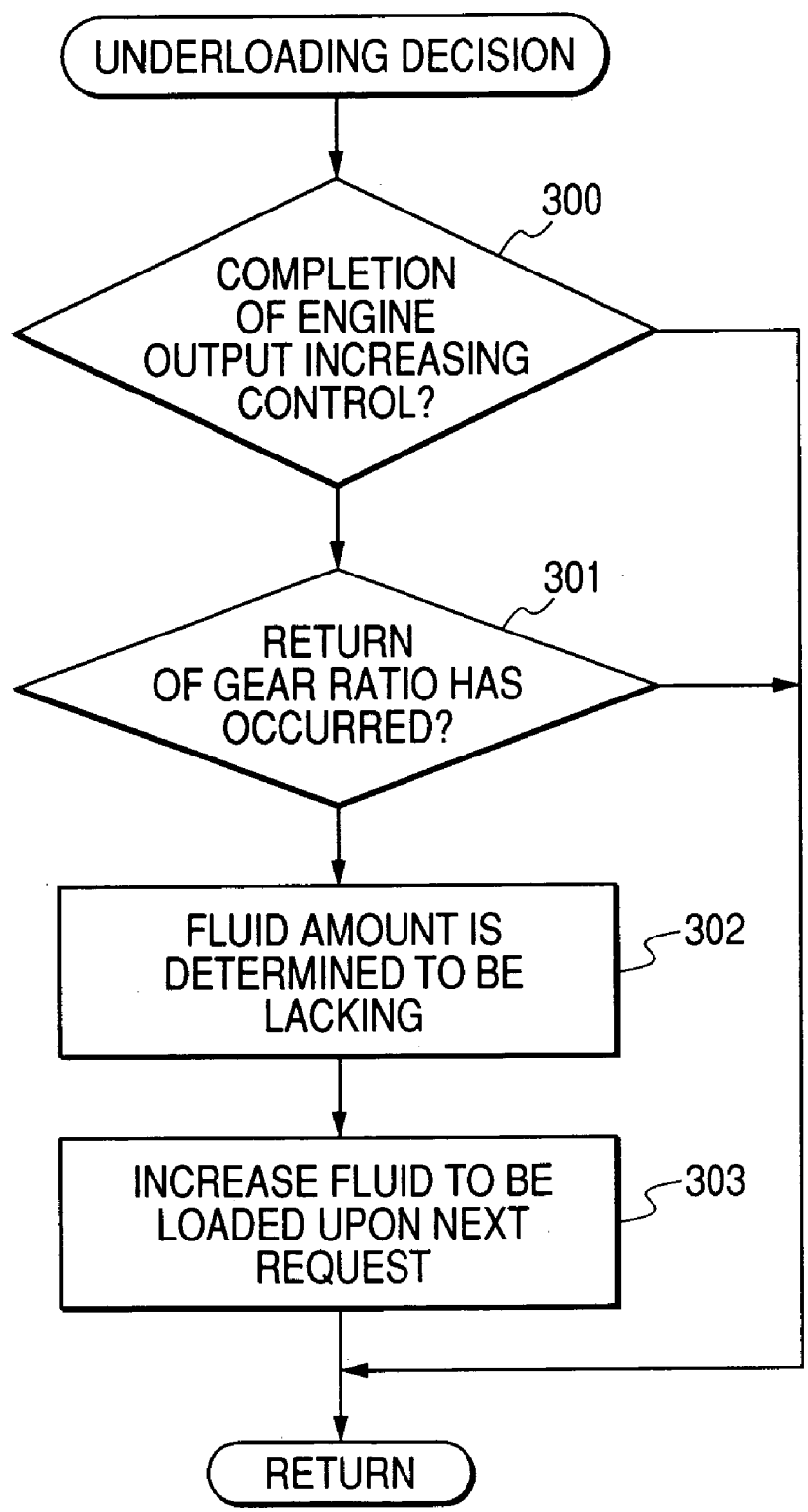
FIG. 23 is a flowchart of a program to be executed to determine whether the amount of working fluid loaded to an on-coming clutch is lacking or not to correct the amount of working fluid to be used during quick loading control to be executed upon a subsequence input of a downshift request in the fifth embodiment of the invention.
Figure 24:
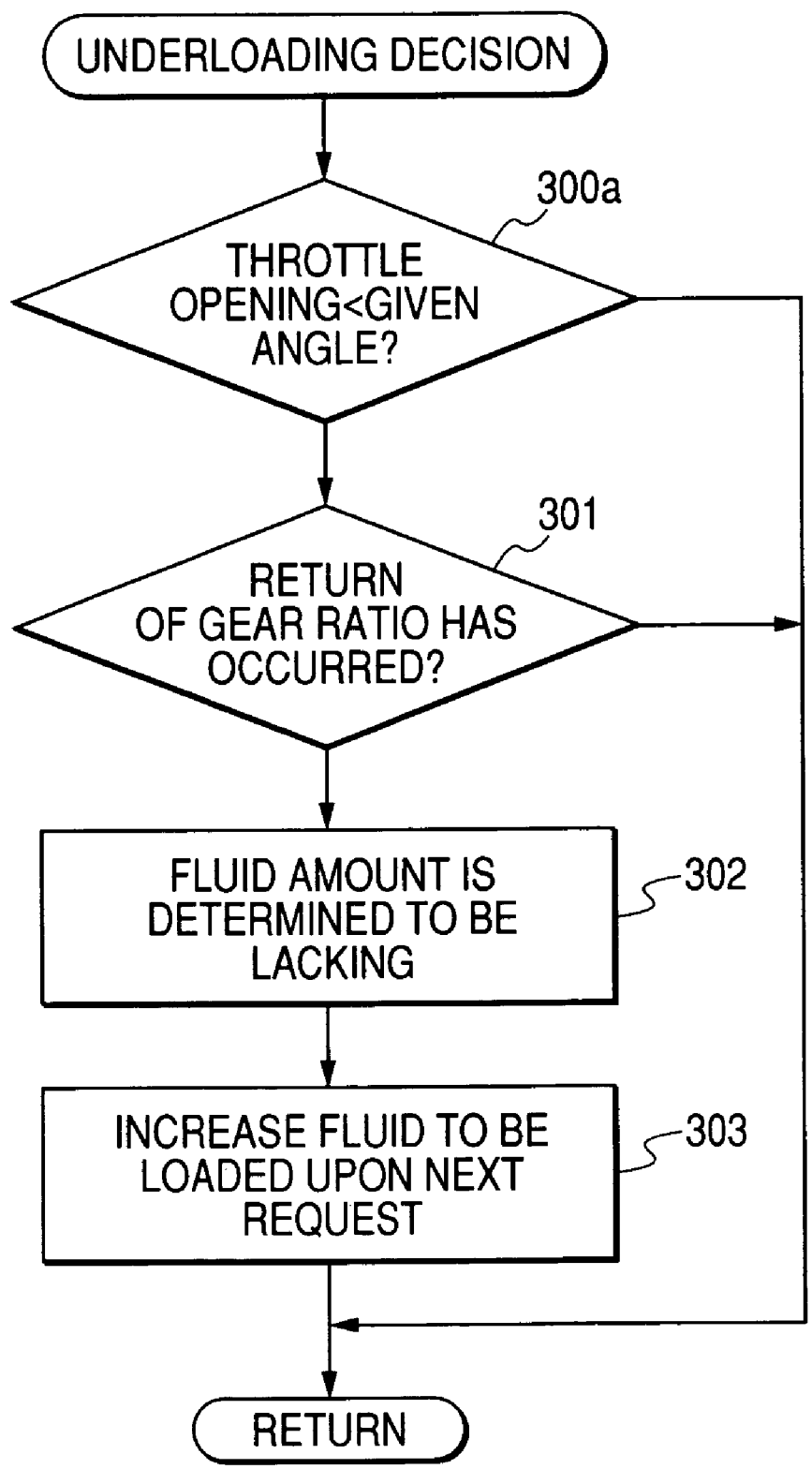
FIG. 24 is a flowchart of a program which is a modified form of the one of FIG. 23.

The AT-ECU 70 of this embodiment works to execute either of sub-programs, as illustrated in FIGS. 23 and 24, in step 106 of FIG. 7.

First, in step 300 of FIG. 23, it is determined whether the engine output increasing control has been completed or not. If a YES answer is obtained, a loaded-fluid lack decision permission flag is set to ON to permit the routine to proceed to following steps 301 to 303 for deciding whether the working fluid loaded to the on-coming clutch is lacking or not. Steps 301 to 303 are the same as those in FIG. 18, and explanation thereof in detail will be omitted here. Alternatively, if a NO answer is obtained in step 300, the loaded-fluid lack decision permission flag is set to OFF to inhibit the loaded-fluid lack decision from being made.

Instead of the sub-program of FIG. 23, one, as illustrated in FIG. 24 may be executed. In step 300a, it is determined whether the open angle of the throttle valve 15 is less than a given value or not. If a NO answer is obtained, the loaded-fluid lack decision permission flag is set to OFF to inhibit the loaded-fluid lack decision from being made. Alternatively, if a YES answer is obtained, the loaded-fluid lack decision permission flag is set to ON to allow the routine to proceed to following steps 301 to 303 for deciding whether the working fluid loaded to the on-coming clutch is lacking or not.

The engine control system according to the sixth embodiment will be described below.

Usually, the shift shock occurring when the working fluid loaded to the on-coming clutch is lacking is smaller in scale than that when the working fluid is overloaded to the on-coming clutch. This causes the driver of the vehicle to feel less uncomfortable when the working fluid loaded to the on-coming clutch is lacking. It is, thus, advisable that the target value of the quickly loaded fluid amount (i.e., the time duration tF for which the quick loading control is executed and/or the hydraulic pressure control command value Po) be selected to a lower limit of a range not resulting in a lack of the quickly loaded fluid amount.

Figure 25:
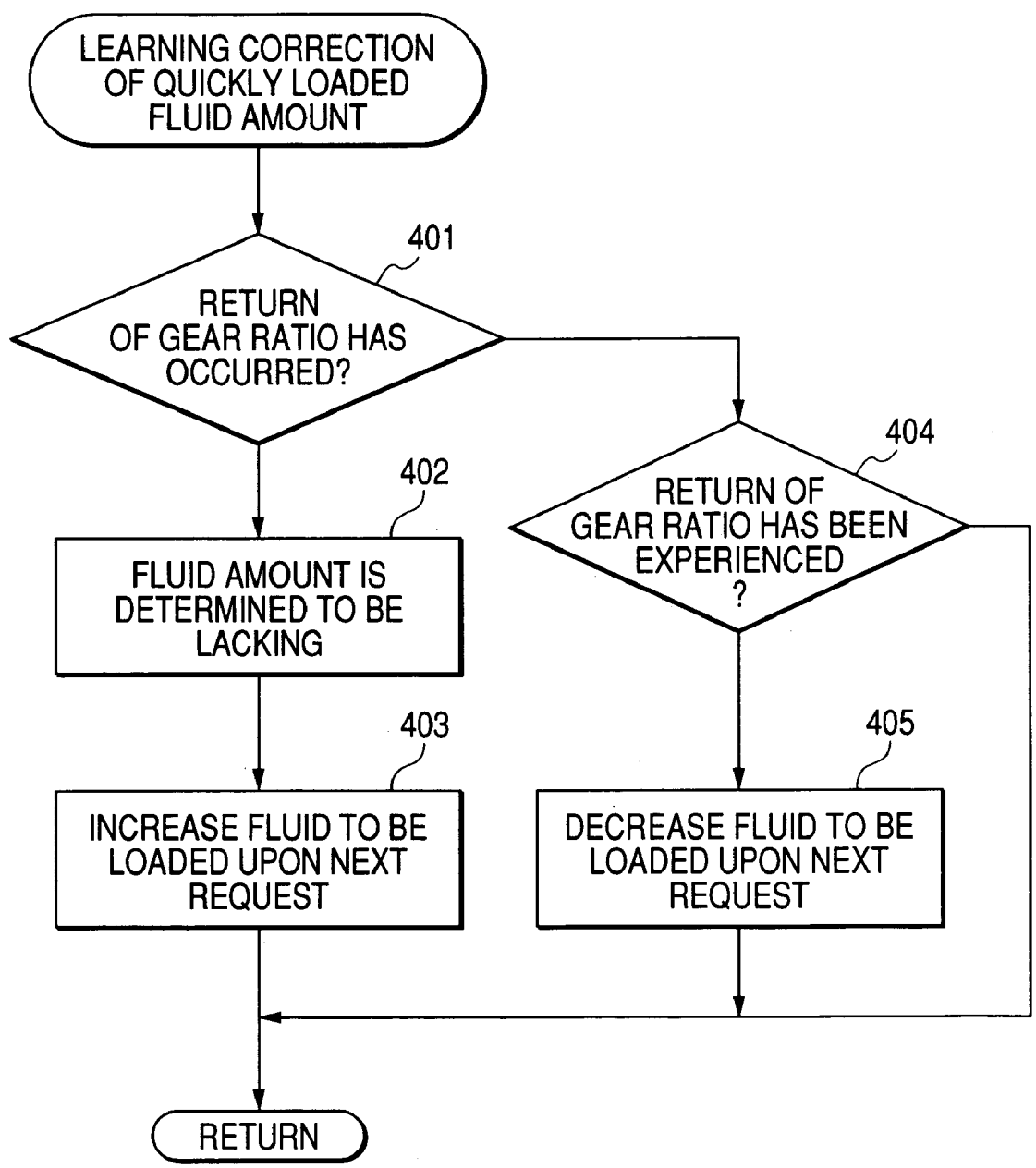
FIG. 25 is a flowchart of a program to be executed to learn the amount of working fluid to be loaded to an on-coming clutch quickly during a downshift control in the sixth embodiment of the invention.

The engine control system of this embodiment is designed to execute a quick-loaded fluid amount learning correction program, as illustrated in FIG. 25, to correct the controlled parameter(s) (i.e., the time duration tF and/or the hydraulic pressure control command value Po) so as to decrease the quickly loaded fluid amount upon every request of the deceleration downshift until a lack of the working fluid loaded to the on-coming clutch is found, determine or learn the value(s) of the controlled parameter(s) just before the lack of the working fluid loaded to the on-coming clutch, and perform the quick loading control using the determined value(s) upon a subsequent request of the deceleration downshift.

After entering the program of FIG. 25, the routine proceeds to step 401 wherein it is determined whether it is determined whether a return of the gear ratio of the transmission gearbox 55 has occurred or not. If a NO answer is obtained, it is concluded that the quickly loaded fluid amount is not lacking. The routine proceeds to step 404 wherein it is determined whether the transmission gearbox 55 does not yet experience the return of the gear ratio or not after initiation of this program. If a NO answer is obtained meaning that the return of the gear ratio has been already experienced, then the routine terminates. Alternatively, if a YES answer is obtained, then the routine proceeds to step 405 wherein the controlled parameter(s) (i.e., the time duration tF for which the quick loading control is executed and/or the hydraulic pressure control command value Po) is corrected to decrease the amount of working fluid to be loaded to the on-coming clutch upon the next request of the deceleration downshift by a given amount.

If a YES answer is obtained in step 401 meaning that the return of the gear ratio has occurred, then the routine proceeds to step 402 wherein it is determined that the quickly loaded fluid amount is lacking, and the loaded-fluid lack flag is set to ON. The routine proceeds to step 403 wherein the controlled parameter(s) (i.e., the time duration tF and/or the hydraulic pressure control command value Po) is corrected to increase the amount of working fluid to be loaded to the on-coming clutch upon the next request of the deceleration downshift by a given amount.

As apparent from the above discussion, the engine control system of this embodiment works to decrement the quickly loaded fluid amount cyclically upon each request of the deceleration downshift until the lack of the working fluid loaded to the on-coming clutch is found and learn the value(s) of the controlled parameter(s) just before the working fluid loaded to the on-coming clutch lacks to use it in performing the quick loading control upon a subsequent request of the deceleration downshift. This keeps the quickly loaded fluid amount at the value just before the lack of the working fluid loaded to the on-coming clutch, thus achieving the deceleration downshift with the smallest shift shock.

Figure 26:
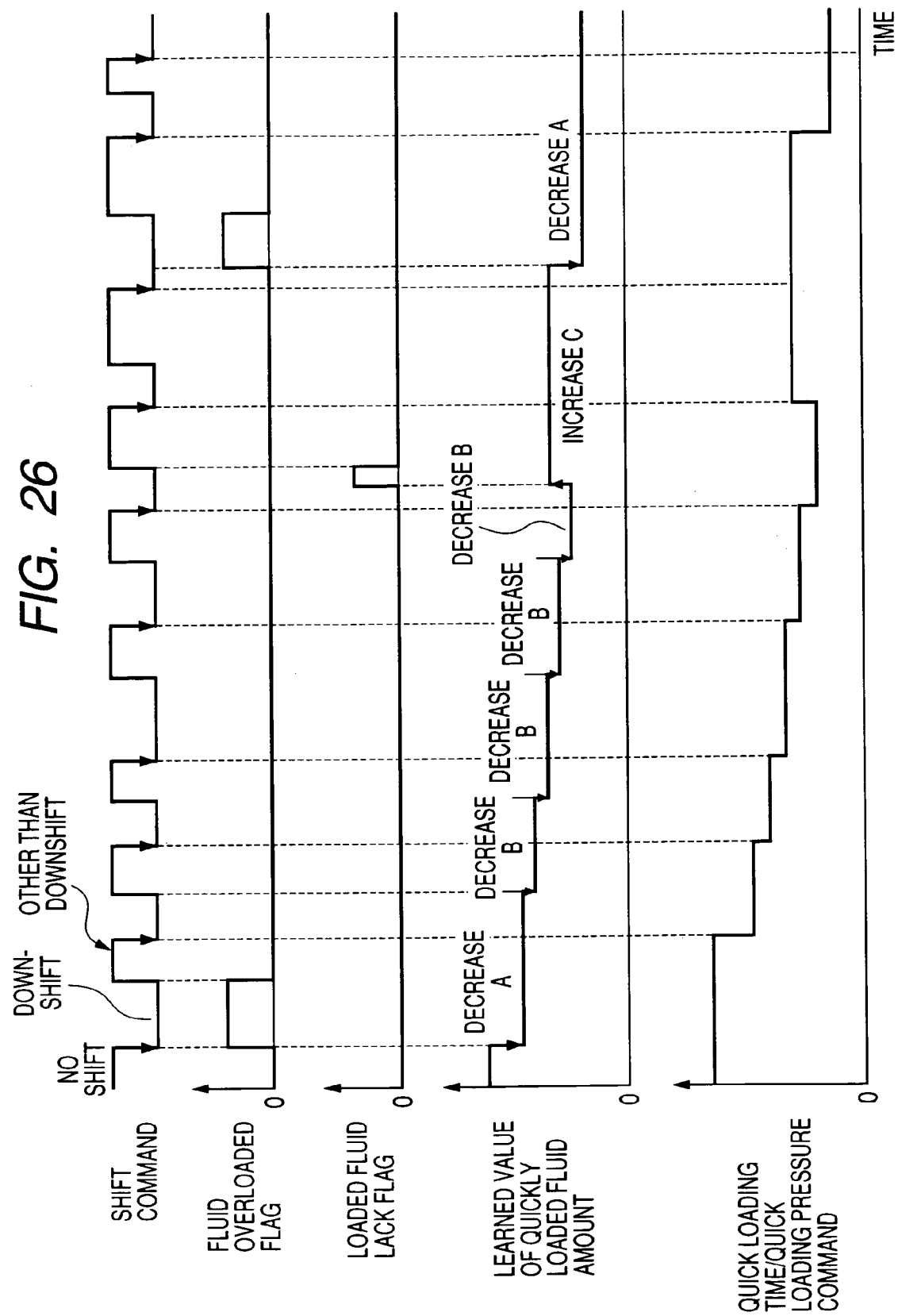
FIG. 26 is a timechart which demonstrates learning of the amount of working fluid to be loaded to an on-coming clutch quickly during a downshift in the seventh embodiment of the invention.
Figure 27:
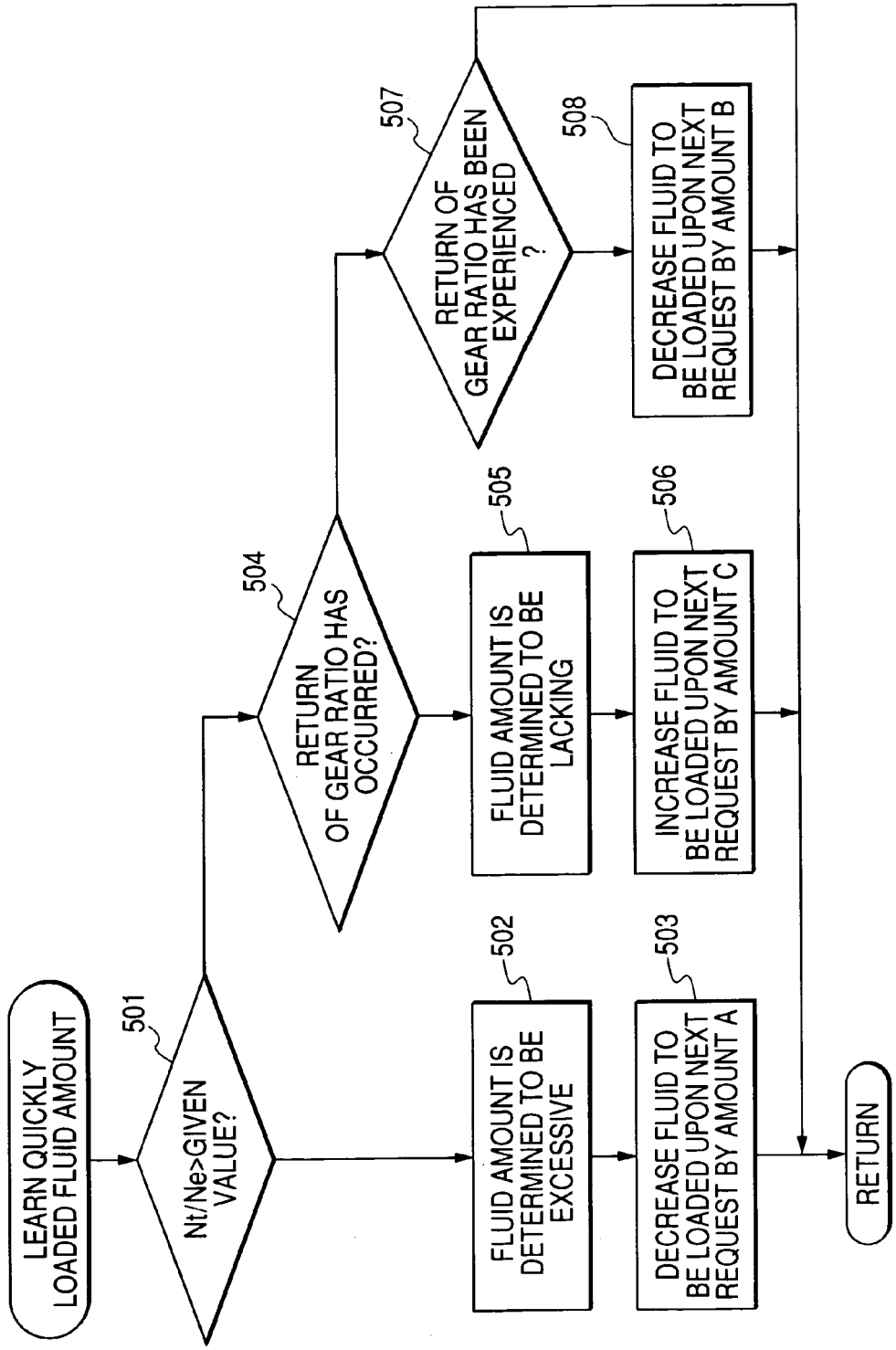
FIG. 27 is a flowchart of a program to be executed to learn the amount of working fluid to be loaded to an on-coming clutch quickly during a downshift control in the seventh embodiment of the invention.

The engine control system according to the seventh embodiment will be described below with reference to FIGS. 26 and 27.

The engine control system is designed to find both the overloading and lack of working fluid to the on-coming clutch and perform the quick loading control in two learning modes. When the fact that the working fluid has been overloaded to the on-coming clutch is found, the first learning mode is entered to decrement the amount of working fluid to be loaded to the on-coming clutch upon a subsequent quest of the deceleration downshift by a greater amount, as labeled with "A" in FIG. 26, for the purpose of bringing it into agreement with a suitable one quickly. When that fact is not found, the second learning mode is entered to decrement the amount of working fluid to be loaded to the on-coming clutch upon a subsequent quest of the deceleration downshift by a smaller amount, as labeled with "B" in FIG. 26, until the lack of the working fluid is found. In this way, the AT-ECU 70 learns the value(s) of the time duration tF for which the quick loading control is to be executed and/or the hydraulic pressure control command value Po. The At-ECU 70 executes the program in FIG. 27.

After entering the program, the routine proceeds to step 501 wherein it is determined whether a ratio of the input shaft speed Nt to the engine speed Ne (i.e., Nt/Ne) is greater then a given value or not, that is, whether the quickly loaded fluid amount is excessive or not. If a YES answer is obtained, then the routine proceeds to step 502 wherein it is determined that the quickly loaded fluid amount is excessive, and the fluid overloaded flag is set to ON. The routine proceeds to step 503 wherein the controlled parameter(s) (i.e., the time duration tF for which the quick loading control is executed and/or the hydraulic pressure control command value Po) is corrected to decrease the amount of working fluid to be loaded to the on-coming clutch upon the next request of the deceleration downshift by a preselected amount A. The amount A may be changed as a function of an excess of the quickly loaded fluid amount.

When the amount of working fluid loaded to the on-coming clutch is regulated properly by the above correction, a NO answer will be obtained in step 501. The routine then proceeds to step 504 wherein it is determined whether a return of the gear ratio of the transmission gearbox 55 has occurred or not during the deceleration downshift. If a NO answer is obtained, it is concluded that the quickly loaded fluid amount is not lacking. The routine proceeds to step 507 wherein it is determined whether the transmission gearbox 55 does not yet experience the return of the gear ratio or not after initiation of this program. If a NO answer is obtained meaning that the return of the gear ratio has been already experienced, then the routine terminates. Alternatively, if a YES answer is obtained, then the routine proceeds to step 508 wherein the controlled parameter(s) (i.e., the time duration tF for which the quick loading control is executed and/or the hydraulic pressure control command value Po) is corrected to decrease the amount of working fluid to be loaded to the on-coming clutch upon the next request of the deceleration downshift by a preselected amount B. The amount B is set smaller than the amount A. The decreasing of the quickly loaded fluid amount by the amount B continues to be performed until the return of the gear ratio is detected, that is, the lack of fluid loaded to the on-coming clutch is detected.

If a YES answer is obtained in step 504 meaning that the return of the gear ratio has occurred, then the routine proceeds to step 505 wherein it is determined that the quickly loaded fluid amount is lacking, and the loaded-fluid lack flag is set to ON. The routine proceeds to step 506 wherein the controlled parameter(s) (i.e., the time duration tF and/or the hydraulic pressure control command value Po) is corrected to increase the amount of working fluid to be loaded to the on-coming clutch upon the next request of the deceleration downshift by a preselected amount C which is smaller than the amount A. The amount C may be a set constant or changed as a function of the lack of the working fluid loaded to the on-coming clutch.

As apparent from the above discussion, the engine control system of this embodiment works to set the amount, by which the working fluid to be loaded to the on-coming clutch is decremented, greater when the quickly loaded fluid amount is determined to be excessive, set it smaller when the quickly loaded fluid amount is determined not to be excessive, and keep it until the lack of the quickly loaded fluid amount is found to search or learn values of the controlled parameter(s) immediately before the quickly loaded fluid amount becomes lacking, thereby curing the fluid-overloaded state of the on-coming clutch quickly to avoid a large-scale shock arising from a gear shift of the transmission gearbox 55 and ensuring the accuracy of learning the value of the controlled parameters.

Once the values of the controlled parameter(s) immediately before the lack of the quickly loaded fluid amount are learned, the learning operations (i.e., the operations in steps 507 and 508) may not be performed.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An automatic transmission control apparatus for a vehicle comprising:

a hydraulic control circuit working to control hydraulic pressures of working fluid loaded to a plurality of frictional elements of a transmission mechanism joined at an input shaft thereof to an engine through a torque converter to selectively achieve engagement and disengagement of the frictional elements for establishing a required speed of the transmission mechanism;

a downshift control circuit working to make a downshift of the transmission mechanism through said hydraulic control circuit to develop an engine braking speed which establishes engine braking in a sequence of a first, a second, and a third downshifting stage upon a deceleration downshift request that is a request to downshift the transmission mechanism to decelerate the vehicle, in the first downshifting stage, said downshift control circuit controlling a given parameter to perform quick loading control which loads the working fluid at a higher rate to an on-coming frictional element that is one of the frictional elements which achieves the engine braking speed until just before the on-coming frictional element is engaged, in the second downshifting stage entered following the first downshifting stage, said downshift control circuit keeping the working fluid loaded to the on-coming frictional element at a given standby pressure to conduct the downshift, in the third downshifting stage entered when the downshift reaches a given degree in the second downshifting stage, said downshift control circuit increasing the hydraulic pressure applied to the on-coming clutch to complete the downshift;

an engine output increasing circuit working to perform engine output increasing control to increase an output of the engine during the downshift of the transmission mechanism regardless of a request to accelerate the engine made by an operator;

a fluid-overloading decision circuit working to decide whether a quickly loaded fluid amount that is an amount of the working fluid loaded to the on-coming clutch during the quick loading control is excessive or not based on an input shaft speed that is a speed of the input shaft of the transmission mechanism and a speed of the engine; and a fluid-loaded amount correcting circuit working to correct the parameter controlled by said downshift control circuit to decrease an amount of the working fluid which is to be loaded to the on-coming clutch during the quick loading control upon a following input of the deceleration downshift request when it is decided that the quickly loaded fluid amount is excessive.

2. An automatic transmission control apparatus as set forth in claim 1, wherein when one of a difference between the input shaft speed of the transmission mechanism and the speed of the engine and a ratio of the input shaft speed and the speed of the engine is smaller than a given value, said fluid-overloading decision circuit decides that the quickly loaded fluid amount is excessive.

3. An automatic transmission control apparatus as set forth in claim 1, wherein during a time when one of a given downshift degree parameter representing a degree of the downshift of the transmission mechanism and a gear ratio of the transmission mechanism is smaller than a given value, said fluid-overloading decision circuit decides whether the quickly loaded fluid amount is excessive or not.

4. An automatic transmission control apparatus as set forth in claim 1, wherein during one of times when the engine output increasing control is being executed and when a throttle valve is opened to a given angle or more, said fluid-overloading decision circuit decides whether the quickly loaded fluid amount is excessive or not.

5. An automatic transmission control apparatus as set forth in claim 1, when it is determined that the quickly loaded fluid amount is excessive, said fluid-loaded amount correcting circuit corrects at least one of a time duration in which the quick loading control is executed and a hydraulic control command to control the hydraulic pressure applied to the on-coming clutch through said hydraulic control circuit to decrease the amount of the working fluid.

6. An automatic transmission control apparatus as set forth in claim 5, wherein said fluid-overloading decision circuit determines an excess of the working fluid loaded to the on-coming clutch when it is determined that the quickly loaded fluid amount is excessive, and wherein said fluid-loaded amount correcting circuit corrects at least one of the time duration and the hydraulic control command based on the excess of the working fluid.

7. An automatic transmission control apparatus for a vehicle comprising:
  a hydraulic control circuit working to control hydraulic pressures of working fluid loaded to a plurality of frictional elements of a transmission mechanism joined at an input shaft thereof to an engine mounted in a vehicle through a torque converter to selectively achieve engagement and disengagement of the frictional elements for establishing a required speed of the transmission mechanism;
  a downshift control circuit working to make a downshift of the transmission mechanism through said hydraulic control circuit to develop an engine braking speed which establishes engine braking in a sequence of a first, a second, and a third downshifting stage upon a deceleration downshift request that is a request to downshift the transmission mechanism to decelerate the vehicle, in the first downshifting stage, said downshift control circuit controlling a given parameter to perform quick loading control which loads the working fluid quickly to an on-coming frictional element that is one of the frictional elements which achieves the engine braking speed until just before the on-coming frictional element is engaged, in the second downshifting stage entered following the first downshifting stage, said downshift control circuit keeping the working fluid loaded to the on-coming frictional element at a given standby pressure to conduct the downshift, in the third downshifting stage entered when the downshift reaches a given degree in the second downshifting stage, said downshift control circuit increasing the hydraulic pressure applied to the on-coming clutch to complete the downshift;
  an engine output increasing circuit working to perform engine output increasing control to increase an output of the engine during the downshift of the transmission mechanism regardless of a request to accelerate the engine made by an operator;
  a fluid-lack decision circuit working to decide whether a quickly loaded fluid amount that is an amount of the working fluid loaded to the on-coming clutch during the quick loading control is lacking or not based on a determination of whether a return of one of a gear ratio of the transmission mechanism and a given downshift degree parameter representing a degree of the downshift of the transmission mechanism has occurred or not; and
  a fluid-loaded amount correcting circuit working to correct the parameter controlled by said downshift control circuit to increase an amount of the working fluid which is to be loaded to the on-coming clutch during the quick loading control upon a following input of the deceleration downshift request when it is decided that the quickly loaded fluid amount is lacking.

8. An automatic transmission control apparatus as set forth in claim 7, wherein said fluid-lack decision circuit samples and stores a peak of one of the gear ratio and the downshift degree parameter in a cycle during the downshift, when a difference between the peaks, as sampled at a latest cycle and at an earlier cycle, exceeds a given value, said fluid-lack decision circuit decides that the quickly loaded fluid amount is lacking.

9. An automatic transmission control apparatus as set forth in claim 7, wherein said fluid-lack decision circuit determines a rate of a change in one of the gear ratio and the downshift degree parameter during the downshift, when the rate is greater than or equal to a given value, said fluid-lack decision circuit decides that the quickly loaded fluid amount is lacking.

10. An automatic transmission control apparatus as set forth in claim 7, wherein after completion of the engine output increasing control or when a throttle valve is closed to a given angle or less, said fluid-overloading decision circuit decides whether the quickly loaded fluid amount is lacking or not.

11. An automatic transmission control apparatus as set forth in claim 7, when it is determined that the quickly loaded fluid amount is lacking, said fluid-loaded amount correcting circuit corrects at least one of a time duration in which the quick loading control is executed and a hydraulic control command to control the hydraulic pressure applied to the on-coming clutch through said hydraulic control circuit to increase the amount of the working fluid.

12. An automatic transmission control apparatus as set forth in claim 11, wherein said fluid-overloading decision circuit determines a lack of the working fluid loaded to the on-coming clutch when it is determined that the quickly loaded fluid amount is lacking, and wherein said fluid-loaded amount correcting circuit corrects at least one of the time duration and the hydraulic control command based on the lack of the working fluid.

13. An automatic transmission control apparatus as set forth in claim 7, wherein said fluid-loaded amount correcting circuit corrects the parameter controlled by said downshift control circuit to decrease the working fluid to be loaded to the on-coming clutch under the quick loading control until said fluid-lack decision circuit decides that the quickly loaded fluid amount is lacking to learn a value of the parameter just before lack of the quickly loaded fluid amount, and wherein said downshift control circuit performs the quick loading control using the learned value of the parameter upon a subsequent input of the deceleration downshift request.

14. An automatic transmission control apparatus as set forth in claim 13, further comprising a fluid-overloading decision circuit working to decide whether the quickly loaded fluid amount is excessive or not based on an input shaft speed that is a speed of the input shaft of the transmission mechanism and a speed of the engine, and wherein said fluid-loaded amount correcting circuit works to correct the parameter by a greater amount to reduce a degree of overloading of the working fluid loaded to the on-coming clutch at a faster rate when the quickly loaded fluid amount is determined by said fluid-overloading decision circuit to be excessive and also correct the parameter by a smaller amount until the quickly loaded fluid amount is determined by said fluid-lack decision circuit to be lacking when the quickly loaded fluid amount is determined not to be excessive to learn the value of the parameter just before lack of the quickly loaded fluid amount.

* * * * *